(12) United States Patent
Levy

(10) Patent No.: US 11,062,356 B2
(45) Date of Patent: Jul. 13, 2021

(54) SYSTEM AND METHOD FOR TAG BASED UPSELLING

(71) Applicant: Digiprint IP LLC, Longboat Key, FL (US)

(72) Inventor: Avery Levy, Longboat Key, FL (US)

(73) Assignee: DIGIPRINT IP LLC, Longboat Key, FL (US)

( * ) Notice: Subject to any disclaimer, the term of this patent is extended or adjusted under 35 U.S.C. 154(b) by 0 days.

(21) Appl. No.: 15/672,193

(22) Filed: Aug. 8, 2017

(65) Prior Publication Data

US 2019/0050908 A1 Feb. 14, 2019

(51) Int. Cl.
- G06Q 30/02 (2012.01)
- G06F 3/0482 (2013.01)
- G06Q 50/00 (2012.01)
- G06Q 50/10 (2012.01)

(52) U.S. Cl.
CPC ....... *G06Q 30/0267* (2013.01); *G06F 3/0482* (2013.01); *G06Q 30/0222* (2013.01); *G06Q 50/01* (2013.01); *G06Q 50/10* (2013.01)

(58) Field of Classification Search
CPC ................................................ G06Q 30/0631
See application file for complete search history.

(56) References Cited

U.S. PATENT DOCUMENTS

| | | |
|---|---|---|
| 5,572,653 A | 11/1996 | Detemple et al. |
| 5,903,721 A | 5/1999 | Sixtus |
| 6,317,722 B1 * | 11/2001 | Jacobi .................... G06Q 30/02 705/14.51 |
| 6,587,835 B1 | 7/2003 | Treyz et al. |
| 6,978,273 B1 | 12/2005 | Bonneau et al. |
| 7,035,828 B2 | 4/2006 | Ketonen et al. |
| 7,063,263 B2 | 6/2006 | Swartz et al. |
| 7,231,380 B1 | 6/2007 | Pienkos |
| 7,299,202 B2 | 11/2007 | Swanson |
| 9,619,831 B1 | 4/2017 | Kumar et al. |
| 9,898,746 B2 | 2/2018 | Argue et al. |

(Continued)

FOREIGN PATENT DOCUMENTS

| | | |
|---|---|---|
| WO | WO 2018/170326 | 9/2018 |
| WO | WO 2018/170407 | 9/2018 |

OTHER PUBLICATIONS

Ebay Enforces New Picture Requirements, Jun. 4, 2013.*

(Continued)

*Primary Examiner* — Aryan E Weisenfeld
(74) *Attorney, Agent, or Firm* — Polsinelli LLP

(57) ABSTRACT

The present disclosure relates to methods and apparatus where information relating to products and services offered by various providers may be offered for sale to customers via computing devices owned by those customers. Products and services offered to a particular customer may be related to a product previously purchased by that customer or be related to a product that a customer has access to. In certain instances, a product that a customer has access to may include a tag, such as a circuit, a chip, or printed matter that may provide information to an electronic device of a customer. After the customer's device received the information provided by the product tag, other products or services related to the tagged product may be received by the customer device.

33 Claims, 18 Drawing Sheets

(56) References Cited

U.S. PATENT DOCUMENTS

| | | |
|---|---|---|
| 10,134,077 B2 | 11/2018 | Levy |
| 10,580,026 B2 | 3/2020 | Levy |
| 2003/0154135 A1 | 8/2003 | Covington et al. |
| 2005/0189415 A1 | 9/2005 | Fano et al. |
| 2006/0163349 A1 | 7/2006 | Neugbauer |
| 2006/0235721 A1 | 10/2006 | Kavanagh et al. |
| 2007/0138268 A1 | 6/2007 | Tuchman |
| 2009/0030787 A1 | 1/2009 | Pon et al. |
| 2009/0094260 A1 | 4/2009 | Cheng et al. |
| 2010/0174599 A1 | 7/2010 | Rosenblatt et al. |
| 2010/0250336 A1 | 9/2010 | Selinger et al. |
| 2011/0093361 A1 | 4/2011 | Morales |
| 2011/0137715 A1 | 6/2011 | O'Shea et al. |
| 2011/0137742 A1 | 6/2011 | Parikh et al. |
| 2011/0145093 A1 | 6/2011 | Paradise et al. |
| 2011/0173055 A1 | 7/2011 | Ross et al. |
| 2011/0196732 A1 | 8/2011 | Schueller et al. |
| 2011/0226853 A1 | 9/2011 | Soh et al. |
| 2011/0246293 A1 | 10/2011 | Hayward et al. |
| 2012/0085828 A1 | 4/2012 | Ziegler |
| 2012/0271712 A1 | 10/2012 | Katzin et al. |
| 2013/0002405 A1 | 1/2013 | Pesonen et al. |
| 2013/0134213 A1 | 6/2013 | Pallakoff et al. |
| 2013/0191213 A1 | 7/2013 | Beck et al. |
| 2013/0246190 A1 | 9/2013 | Lee |
| 2013/0282466 A1 | 10/2013 | Hampton |
| 2013/0282533 A1 | 10/2013 | Foran-Owens et al. |
| 2014/0067530 A1 | 3/2014 | Pluche et al. |
| 2014/0095282 A1* | 4/2014 | Slonimsky ......... G06Q 30/0261 705/14.16 |
| 2014/0129307 A1 | 5/2014 | Walker et al. |
| 2014/0143086 A1 | 5/2014 | Birsin et al. |
| 2014/0351082 A1 | 11/2014 | Lowinger |
| 2015/0095185 A1* | 4/2015 | Katukuri ............ G06Q 30/0631 705/26.7 |
| 2015/0112826 A1 | 4/2015 | Crutchfield |
| 2015/0206128 A1 | 7/2015 | Torossian et al. |
| 2015/0278849 A1 | 10/2015 | Reichert |
| 2015/0294387 A1 | 10/2015 | Karmazyn et al. |
| 2015/0356660 A1 | 12/2015 | L'Heureux et al. |
| 2015/0363816 A1 | 12/2015 | Poglitsch |
| 2016/0055538 A1 | 2/2016 | Todasco |
| 2016/0253705 A1 | 9/2016 | Eom |
| 2016/0284014 A1 | 9/2016 | Adel |
| 2017/0193429 A1 | 7/2017 | Olson |
| 2017/0221119 A1 | 8/2017 | Pellow et al. |
| 2018/0268457 A1 | 9/2018 | Levy |
| 2018/0268468 A1 | 9/2018 | Levy |
| 2019/0043072 A1 | 2/2019 | Levy |
| 2019/0050895 A1 | 2/2019 | Levy |
| 2019/0050896 A1 | 2/2019 | Levy |
| 2019/0244275 A1 | 8/2019 | Levy |
| 2020/0193461 A1 | 6/2020 | Levy |

OTHER PUBLICATIONS

Krummert et al., (Krummert, B. (Jul. 25, 2013). Customer smartphones: Make them work for you. Restaurant Hospitality, Retrieved from https://search.proquest.com/docview/1412455375?accountid=14753).
U.S. Appl. No. 15/462,727 Office Action dated Jul. 6, 2018.
U.S. Appl. No. 15/671,013 Final Office Action dated Jul. 13, 2018.
Amazon—Get Free assembly with select home fitness equipment, Jul. 18, 2017.
Scan definition 2018.
PCT Application No. PCT/US2018/022879 International Search Report and Written Opinion dated Jun. 7, 2018.
PCT Application No. PCT/US2018/022744 International Search Report and Written Opinion dated Jun. 8, 2018.
U.S. Appl. No. 15/462,751 Office Action dated Mar. 2, 2018.
U.S. Appl. No. 15/462,751 Final Office Action dated Oct. 17, 2017.
U.S. Appl. No. 15/462,751 Office Action dated May 19, 2017.
U.S. Appl. No. 15/462,727 Final Office Action dated Nov. 16, 2017.
U.S. Appl. No. 15/462,727 Office Action dated May 24, 2017.
U.S. Appl. No. 15/672,121 Final Office Action dated Apr. 18, 2018.
U.S. Appl. No. 15/672,121 Office Action dated Sep. 8, 2017.
U.S. Appl. No. 15/672,198 Office Action dated May 17, 2018.
U.S. Appl. No. 15/672,198 Final Office Action dated Jan. 12, 2018.
U.S. Appl. No. 15/672,198 Office Action dated Sep. 11, 2017.
U.S. Appl. No. 15/671,013 Office Action dated Dec. 15, 2017.
Aamoth, Dough; "Shop Amazon Smarter with These Quick Tricks", TIME, Oct. 2, 2014.
U.S. Appl. No. 15/462,727 Office Action dated Oct. 1, 2019.
U.S. Appl. No. 15/672,121 Final Office Action dated Nov. 21, 2019.
U.S. Appl. No. 15/462,727 Final Office Action dated Feb. 4, 2019.
U.S. Appl. No. 15/672,121 Office Action dated Jan. 25, 2019.
U.S. Appl. No. 15/672,198 Final Office Action dated Mar. 7, 2019.
U.S. Appl. No. 15/671,013 Office Action dated Feb. 26, 2019.
U.S. Appl. No. 16/195,305 Office Action dated Jul. 9, 2020.
U.S. Appl. No. 15/462,727 Final Office Action dated Apr. 1, 2020.
PCT Application No. PCT/US2018/022879 International Preliminary Report on Patentability dated Sep. 17, 2019.
PCT Application No. PCT/US2018/022744 International Preliminary Report on Patentability dated Sep. 17, 2019.
U.S. Appl. No. 15/672,121 Office Action dated Aug. 27, 2020.
U.S. Appl. No. 16/195,305 Final Office Action dated Jan. 8, 2021.
U.S. Appl. No. 15/462,751, Avery Levy, Upselling Offerings to Customers, filed Mar. 17, 2017.
PCT/US18/22744, Upsell System, Mar. 15, 2018.
U.S. Appl. No. 15/462,727, Avery Levy, Upselling Related Products Via a User Device, filed Mar. 17, 2017.
U.S. Appl. No. 15/672,121, Avery Levy, Method and Apparatus for Linking to an Upsell System Via a Tag, filed Aug. 8, 2017.
U.S. Appl. No. 15/672,198, Avery Levy, System and Method for Upselling Products and Services, filed Aug. 8, 2017.
U.S. Appl. No. 15/671,013, Avery Levy, In Store Upselling, filed Aug. 7, 2017.
PCT/US18/22879, In Store Upselling, Mar. 16, 2018.
U.S. Appl. No. 16/195,305, Avery Levy, Upselling to Customers, filed Nov. 19, 2018.
Chandler, Michele; "Apple iBeacons Push 'Proximity' Marketing Startup Swirl attracts funding from Twitter, pact with RetailMeNot", Investor's Business Daily; Los Angeles May 11, 215: A09. 5 pages.
U.S. Appl. No. 15/462,727 Office Action dated Mar. 10, 2021.
U.S. Appl. No. 16/705,087 Office Action dated Apr. 1, 2021.

* cited by examiner

Servicing request from providers

SYSTEM AND METHOD FOR TAG BASED UPSELLING

BACKGROUND OF THE INVENTION

Field of the Invention

The present invention is generally directed to systems and methods for selling products or services. More specifically, the present invention assists providers and customers better identify products or services that may be of interest to those customers.

This invention is an upselling system that may provide opportunities for selling related products or services after the product has left the retail store or has been shipped to a customer or used. This invention extends to having the smart packaging in the product itself so long term upsells and information can be embedded in or with the product or in a smart card or other media delivered separately.

The invention extends to having the retail store or provider of e-commerce that may sell the manufactured product or a service related to that product, to be involved in the sales and ordering function of follow-on product and service sales. The invention extends to allowing the customer to store and manage a wish list, scheduled purchases, alerts and fulfillment options, perform other services and also ask questions of the up-seller even if they are not the original eCommerce/retailer.

Utilizing smart packaging or card technology (U.S. Pat. Nos. 8,125,667 and 8,970,864) to provide a completely customized and targeted sales and ordering function on a shipped package to upsell related products of the product that gets shipped that has either integration of (1) goes around the original e-commerce supplier of the product or (2) goes through the original e-commerce supplier of which both integrations capable of executing the purchase of the related merchandise without returning to the website or store.

Methods and systems for selling products and services to customers today are performed via a variety of means that include direct person to person sales, by phone, or by computer via the internet. These systems and methods are limited as they do not timely or conveniently provide customers with information regarding different products and services sold by various different providers when customers receive or obtain a product that may be related to another product or service.

What are needed are systems and methods that allow products and services sold by various different providers to be provided to users in a timely and convenient way upon delivery and/or receiving of a related product or service.

The problem is how to sell follow-on products and related services after the customer has left the retail store, website or opened or used a product? How to create a system that can upsell related products after the product has left the retail store or has been shipped or used?

SUMMARY OF THE PRESENTLY CLAIMED INVENTION

The presently claimed invention relates to apparatus, methods, and non-transitory computer readable storage mediums that collect information from a plurality of different providers that may be used to sell products to customers or users via computing devices that may be owned or used by those customers. A method consistent with the presently claimed invention may receive information relating to products offered by different providers, where the information received from those providers may be stored. This method may also include sending a software application to an electronic device of a user. This software application may associate a first product to another product offered for sale by a provider, where the other product offered to the user may be related to the first product, the other product is ordered by the user, and where the provider fulfills the order of the other product.

In instances where the presently claimed invention is implemented as a non-transitory computer readable storage medium, a processor executing instructions out of the memory may also receive information relating to products offered by different providers, where the information received from those providers may be stored. This method may also include sending a software application to an electronic device of a user. This software application may associate a first product to another product offered for sale by a provider, where the other product offered to the user may be related to the first product, the other product is ordered by the user, and where the provider fulfills the order of the other product.

When the presently claimed invention is implemented in apparatus that includes a memory, a processor, a network interface, and a database, the network interface may receive information relating to products offered by different providers, where the information received from those providers may be stored in the database. The processor executing instructions out of the memory may also implement methods consisting with the present disclosure, where a software application may be sent to an electronic device of a user. This software application may associate a first product to another product offered for sale by a provider, where the other product offered to the user may be related to the first product, the other product is ordered by the user, and where the provider fulfills the order of the other product.

Methods and apparatus consistent with the present disclosure may provide a targeted and custom recommendation for each purchase/customer and a simple/seamless method of purchase. By improving the relevance of product suggestion and reducing the friction of payment, overall sales improve. This use of upsell information (1) on the package or (2) on the product (3) on any related information in the product package or (4) in a smart card or other advertising media delivered after the original sale which will extend the upsell opportunities for both the original provider.

DETAILED DESCRIPTION

The present disclosure relates to methods and apparatus where information relating to products and services offered by various providers may be offered for sale to customers via computing devices owned or used by those customers. Products and services offered to a particular customer may be related to a product previously purchased by that customer or be related to a product that a customer has access to. In certain instances, a product that a customer has access to may include a tag, such as a circuit, a chip, or printed matter which may be affixed, printed or embedded that may provide information to an electronic device of a customer. In certain instances, a smart card including upsell information, a coupon card, a gift card, a credit card, or an advertising card may related to an upsell opportunity may be provided to a customer via a separate delivery. After the customer's device receives the information provided by the product tag, information on other products or services related to the tagged product may be received by the customer device. As such, a smart card or an advertisement associated with a product may facilitate the sale of other products or services. For example, a person that purchased a bicycle that includes a smart card or advertisement could link to offerings that sell bicycle accessories/clothing or that identify entities that perform bicycle maintenance. In certain instances, a smart card or advertisement/print advertisement may offer to sell or link to products or services that are not directly related to a particular product. For example, a smart card or advertisement associated with school supplies (such as pencils, pads, or notebooks) could be used to identify back to school clothing or tutoring services.

Products and services may include but are not limited to products, services and/or upgrades/incentives from: banks and financial institutions; sports and theatre venues; travel sites and travel agencies, hotels, restaurants, rental cars; real estate transactions of any kind; non-profits.

Products and services associated with an up-sell may be offered via a smart card or other media delivered to a person. For example, smart cards or other media may be handed to a person as they walk down the street or be received via the mail. Such up-sell smart cards or media may link to an up-sell system consistent with the present disclosure where a prospective customer may browse up-sell offerings relating to any product or service that a person may be interested in. As such, up-sell offerings consistent with the present disclosure do not have to be linked to a particular product that a person has purchased before.

Figure 1:
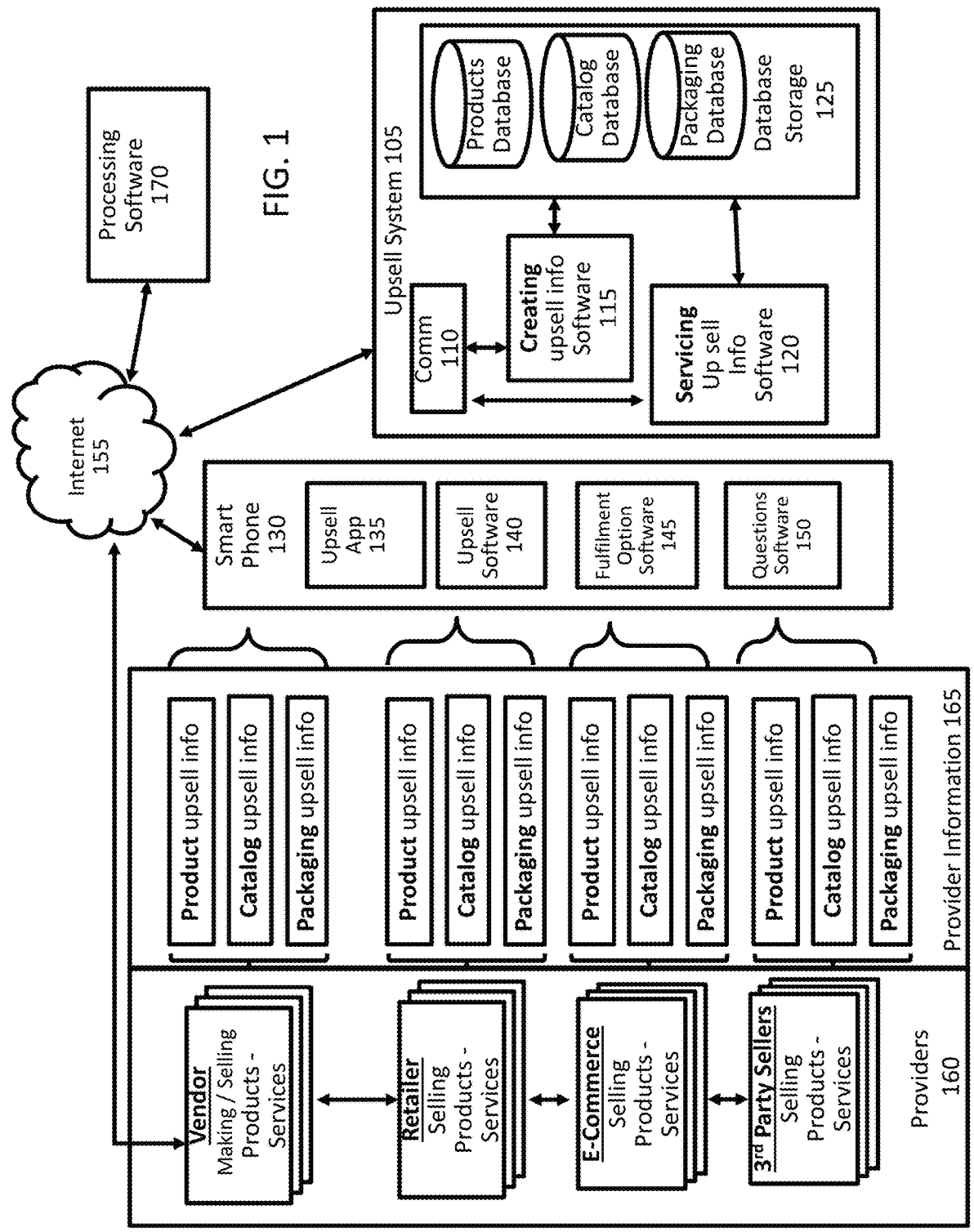
FIG. 1 illustrates an exemplary environment where an upsell system may provide information and services to a user operating a user device.

FIG. 1 illustrates an exemplary environment where an upsell system may provide information and services to a user operating a user device. FIG. 1 includes upsell system 105 that may communicate with user devices, such as smart phone 130, and with service providers 160 via the Internet 155.

Upsell system 105 includes communication interface (COMM) 110, creating upsell information software 115, servicing upsell information software 120, and database storage 125. Note that database storage 125 may include a product database that stores product information, a catalog database that stores information relating to products or services that a customer may purchase, and a packaging database that stores information that identifies product packaging options.

A package is container that encloses an object and/or product. Packaging options are choices provided to a customer related to the type of packaging to be used when shipping the product that was ordered.

A smart card or other advertising may be a hard media delivered to customers after the delivery of the original purchase. The smart card or advertising could be a credit card or rewards card or other type of card imbedded with upsell information and/or other types of customer/provider relationship information. The advertising could identify an entity that provides mobile services or a brick and mortar establishment that could service a product.

A catalog is a document (digital, print or otherwise expressed) that contains an inventory of products and services that is available to potential customers to aid in the purchase of a product or service.

A database is a structured set of data stored in a computer or computer system that is accessible by other computers and computer systems to retrieve data.

The internet 155 is a set of interconnected computers that communicate via the internet protocol suite: including, yet not limited to TCP/IP or other current technology.

Providers 160 illustrated in FIG. 1 include vendors that supply and sell products, retailers that sell products, an e-commerce sales site that sell product online, and third ($3^{rd}$) party sellers. Each of the providers 160 of FIG. 1 may organize various sets of provider information 165 that may be accessed when upsell system 105 organizes the delivery of upsell offerings to a user of smart phone 130. Provider information 165 may include offerings that may be accessible by user devices (user device may be a tablet, a personal data assistant (PDA, personal computer, etc.) like user device 130 via upsell system 105.

A vendor or provider may be is a person or company that produces and may sell products, goods, material or a combination thereof by hand or machinery. A retailer is a seller of products and materials. E-Commerce is the conduct of trade (buying and selling) via the internet. 3$^{rd}$ party sellers are sellers of products who may or may not have a formal arrangement with the provider of the product, retailer and/or the customer to sell similar or complimentary products and/or services.

A user device wireless mobile device, PDA, tablet, personal computer and the like that transmits audio, video and data and incorporates a computer operating system that allows for the execution of software and communication with people and other computers.

FIG. 1 illustrates that user device 130 includes an upsell application 135 software program interface, an upsell software program module, upsell software 140, a fulfillment option software module 145, and a questions software module 150.

In certain instances, providers 160 may provide provider information 165 to upsell system 105 via the internet 155 when upsell offerings are created and stored in database storage 125 at upsell system 105. Upsell offerings include offerings of products and services offered for sale by providers 160, where those offerings may be related to one or more products that a customer has previously purchased.

When providers 160 create upsell information, providers 160 may access the creating upsell information software 115 module via communication interface 110, where the creating upsell information software 115 may store those newly created offerings in database storage 125.

Once upsell offerings have been created and stored in database storage 125 at upsell system 105, those offerings may be provided to user device 130 via the servicing upsell information software 120 module at upsell system 105. The servicing upsell information software module may then provide offering information to a smartphone or user device 130 via communication interface 110 and internet 155. The upsell information received by user device 130 may be accessed by a customer using upsell application 135 and upsell software 140 at user device 130. In certain instances, upsell application 135 may be downloaded to user device 130 from upsell system 105. Upsell application 135 may include or be linked to various different upsell offerings currently offered by providers 160.

When a customer is interested in an upsell offering provided by one or more providers 160, that customer may communicate with one or more providers 160 when purchasing an offering. As such, a user device, such as user device 130 of the customer may not have to communicate with upsell system 105 when the customer makes an upsell purchase. Alternatively or additionally, however, upsell system 105 may be involved in communications between user device 130 and provider 160 offerings when a customer makes purchases. When user device 130 is used to make purchases, the customer making the purchase may compose and send questions and receive answers regarding provider offerings using questions software 150 at user device 130. After a customer makes a purchase using upsell software 140, that customer may select options regarding fulfilling that purchase using fulfillment option software 145. Fulfillment option software 145 may also be used to provide the customer with information relating to the status of the shipment of their offering. As such, fulfillment option software 145 may allow a customer to select how their purchase should be fulfilled and be used to track their purchase when it is being prepared and shipped.

The Upsell System diagram includes providers [(1) Vendors Supply/Selling Products, (2) Retailer Selling Products, and (3) E-Commerce sales site] that interacts through the internet to the Upsell System that has communications (COMM) that allows connection to the creation of the upsell info, to software storing that data for a product, to catalog information, or to packaging databases. The providers ultimately get their respective upsell info on either of the actual product, the catalog with the products(s), or on the packaging, where relevant information may be provided to the customer from their interactions with the providers, the customer may have a smartphone loaded with an upsell app and Upsell Software. When the customer uses the Upsell App 135 they will connect to the Upsell System 105 to find their related upsell info in the databases 125 using the servicing upsell software 120 and then the transaction may be completed by the Processing Software 170 (U.S. Pat. Nos. 8,125,667 and 8,970,864). The 3$^{rd}$ Party Sellers are providers that can sell products through the system when the providers refer them as well as upselling their own items.

An APP is a software application designed to be run on a mobile computing device that can accept user input, interact with external computers and electronic devices and the internet.

Figure 2:
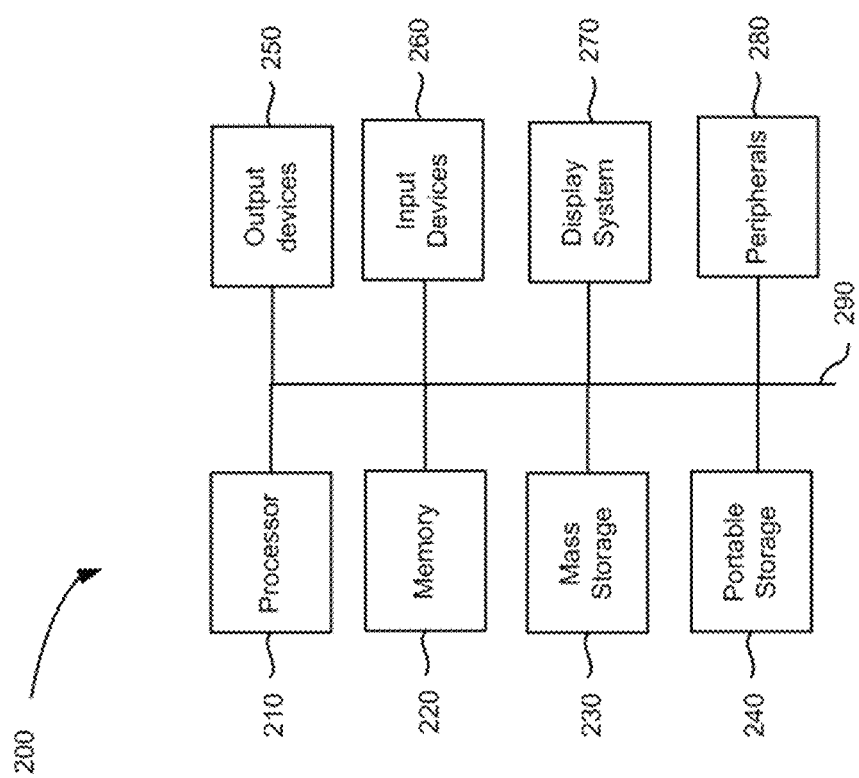
FIG. 2 is a block diagram of an exemplary system for implementing a computing device.

FIG. 2 is a block diagram of an exemplary system for implementing a computing device. The computing system 200 of FIG. 2 includes one or more processors 210 and main memory 220. Main memory 220 stores, in part, instructions and data for execution by processor 210. Main memory 220 can store the executable code when in operation. The system 200 of FIG. 2 further includes a mass storage device 230, portable storage medium drive(s) 240, output devices 250, user input devices 260, a graphics display 270, and peripheral devices 280.

The components shown in FIG. 2 are depicted as being connected via a single bus 290. However, the components may be connected through one or more data transport means. For example, processor unit 210 and main memory 220 may be connected via a local microprocessor bus, and the mass storage device 230, peripheral device(s) 280, portable storage device 240, and display system 270 may be connected via one or more input/output (I/O) buses.

Mass storage device 230, which may be implemented with a magnetic disk drive or an optical disk drive, is a non-volatile storage device for storing data and instructions for use by processor unit 210. Mass storage device 230 can store the system software for implementing embodiments of the present invention for purposes of loading that software into main memory 220.

Portable storage device 240 operates in conjunction with a portable nonvolatile storage medium, such as FLASH memory, compact disk or Digital video disc, to input and output data and code to and from the computer system 200 of FIG. 2. The system software for implementing embodiments of the present invention may be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

Display system 270 may include a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that may be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, iOS, Android and other suitable operating systems.

Mobile computing devices can include smartphones, wearable computers, implanted devices or other portable hardware capable of storing and operating software instruction to execute user commands and communicate with other computer devices via network or other connections.

Figure 3:
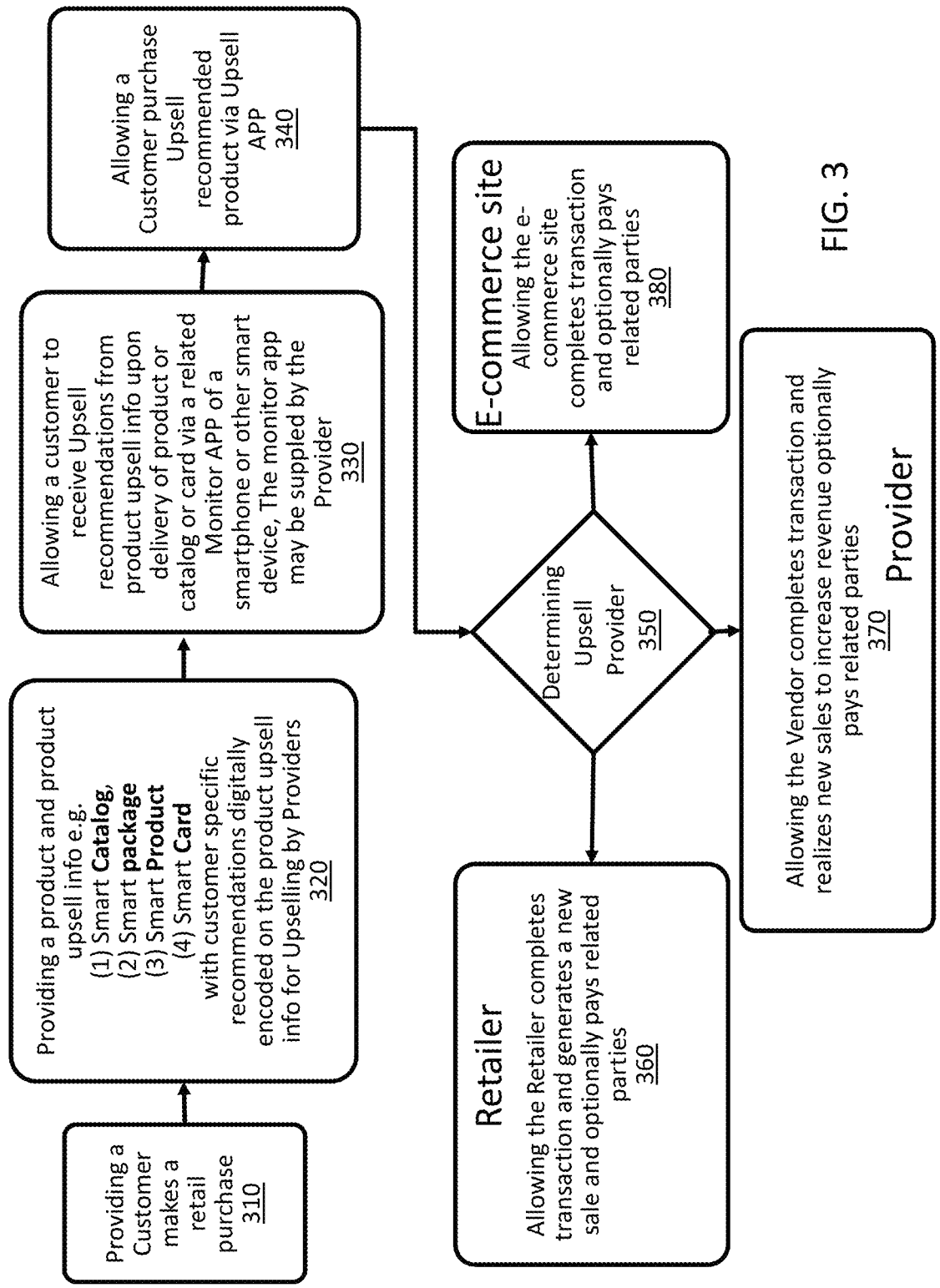
FIG. 3 illustrates an exemplary set of steps that may be performed when upsell opportunities are organized for transmission to a user device.

FIG. 3 illustrates an exemplary set of steps that may be performed when upsell opportunities are organized for transmission to a user device. In step 310 of FIG. 1 a customer operating a user device is provided with the ability to make a purchase. Next, in step 320 of FIG. 1, information regarding a product and/or product upsell information may be provided to the user device. The information provided to the user device in step 320 may include a smart catalog, information regarding a smart provider package, a smart card, a coupon card, a gift card, a credit card, an advertising card, or may include specific recommendations regarding upsell offerings that may be provided by one or more providers (i.e. vendors, retailers, $3^{rd}$ party providers, and an e-commerce site). In certain instances, upsell offerings offered to a customer operating a user device may include information that is digitally encoded on the product. The advertising could identify an entity that provides mobile services or a brick and mortar establishment that could service a product.

Information encoded on a product may be encoded in various different means. In certain instances, a circuit or a wireless transceiver may be embedded in the product where a user device may wirelessly read information from the circuit or wireless transceiver. In such instances, the circuit or wireless transceiver embedded in the product may extract power from a wireless transmission from a user device that causes the circuit or wireless transceiver to transmit information to the user device wirelessly. Alternatively, or additionally, information encoded in a product may be visually encoded, where a user of a user device may take a picture of the visually encoded information that causes the user device to link to a WEB page that provides information to the user of the user device via a display at the user device.

After step 320, step 330 allows the customer to receive upsell recommendations via their user device. Those upsell recommendations may include information relating to the delivery of a product and may be provided via a software monitoring application program installed on the customer's user device. In certain instances, the software monitoring application program may be an application program (i.e. an "app") that is provided by a provider, a retailer, a $3^{rd}$ party provider, or an e-commerce site.

Next in step 340, the customer may be allowed to purchase a recommended upsell product offering via an upsell software application installed on their user device. After a user has decided to purchase an upsell offering in step 340, determination step 350 identifies an upsell provider that could best service a purchase order related to the customer's upsell purchase decision. Depending on which provider has been identified as being the best provider to service the upsell offering purchase order, that purchase order may be passed to a retailer, to a provider, or to an e-commerce site. Note that step 360 of FIG. 3 may relate to actions associated with the purchase order that may be performed at a retailer. Note that step 370 of FIG. 3 is associated with actions associated with the purchase order that may be performed at a provider. Similarly, step 380 of FIG. 3 is associated with actions associated with the purchase order that may be performed at an e-commerce site. Actions relating to servicing an upsell purchase order may include completing transactions, paying related parties, and providing shipment information.

The method involves (1) providing a Customer makes a retail purchase 310 and (2) providing a product which is delivered with product upsell info 320 e.g. by a (1) Smart Catalog, (2) Smart Package and/or (3) Smart Product (4) Smart Card or advertising that has customer specific recommendations digitally encoded with product upsell info or a link to external information for Upselling by e-commerce site, provider or retailer other party and (3) allowing a customer to receive Upsell recommendations 330 from product upsell info upon delivery of product via a related Upsell APP of a smartphone or other smart device. The monitor app may be supplied by the catalog, provider or e-commerce site or retailer, (4) allowing a customer to purchase an Upsell recommended product via Monitor or Upsell APP 340, and (5) Determining an Upsell provider 350. When step 350 determines that the upsell provider should be a retailer 360, allowing the retailer to complete transactions to generate new sales, and to optionally pay related parties. When step 350 determines that the upsell provider should be provider 370, provider 370 may be allowed to complete transactions, to realize new sales to increase revenue, and to optionally pay related parties. When step 350 determines that the provider should be e-commerce site 380, e-commerce site 380 may be allowed to complete transactions and optionally pay related parties.

Figure 4:
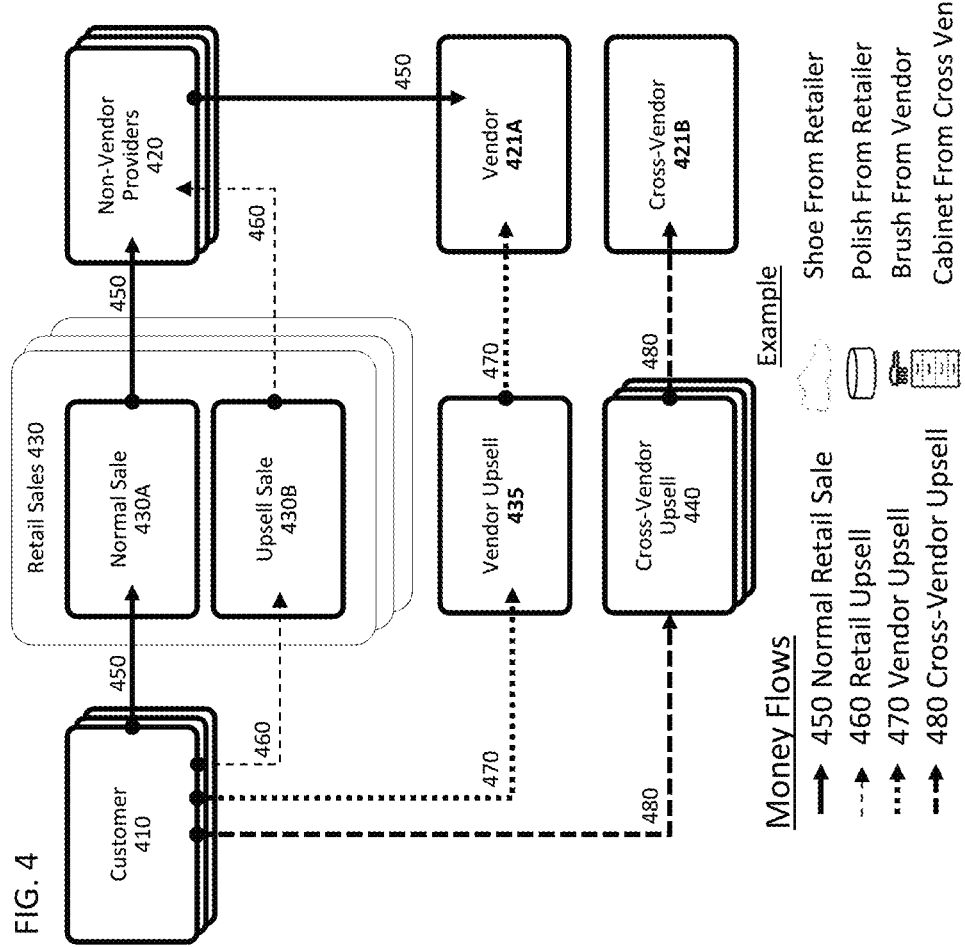
FIG. 4 illustrates various different types of flows of monies (or revenues) of different types that may be processed by systems and methods consistent with the present disclosure.

FIG. 4 illustrates various different types of flows of monies (or revenues) of different types that may be processed by systems and methods consistent with the present disclosure. FIG. 4 includes entities of customer 410, providers/non-vendor providers 420, retail sales 430 (430A/430B). Cross provider upsell sales may also be provided. Cross provider upsell sales are sales that may be provided by more than one entity, such entities may provide retail sales 430 or other providers 420 the ability to upsell products to a customer. As such upselling products in this way may allow additional monetary flows 450, 460, 470, and 480 to be generated. In certain instances, monetary flows 450, 460, 470, and 480 may flow between vendors, where funds relating to purchases may be forwarded from one vendor to another as appropriate. Note that sales provided by retailers 430 (retail sales) include both normal sales 430A and upsell sales 430B.

Money flows illustrated in FIG. 4 include revenue flows related to normal retail money flows 450, retail upsell money flows 460, provider upsell money flows 470, and cross-provider upsell money flows 480. FIG. 4 thus, illustrates that revenues may flow between customer 410 and a retail sales establishment when customer 410 buys products or services from a retailer, i.e. when normal sales 430A or upsell sales 430B are made.

FIG. 4 also illustrates that revenue may flow between other providers 420 and with cross-provider upsell 440 entities, where providers 420 and cross-provider upsell 440 entities may transfer monies between the retailer 430 that performs upsell sales 430B and a retailer 430 that performs normal sales 430A. Because of this providers 420 and cross-provider upsell entities 440 may allow other entities, such as retailer 430 to receive revenue when retailer 430 sells products or services related to a sale made by provider 420 or by cross-provider upsell entity 440 or visa-versa. Similarly, cross vendor sales may be processed by vendor up-seller 435 interacting with vendor 421A according to monetary flow 470 or may be processed by a cross-provider up-seller 440 interacting with cross vendor 421B according to monetary flow 480.

This method shows the flow of funds between the customers and the providers for a normal sale and an upsell sale when cross providers are used in the upsell.

Figure 5:
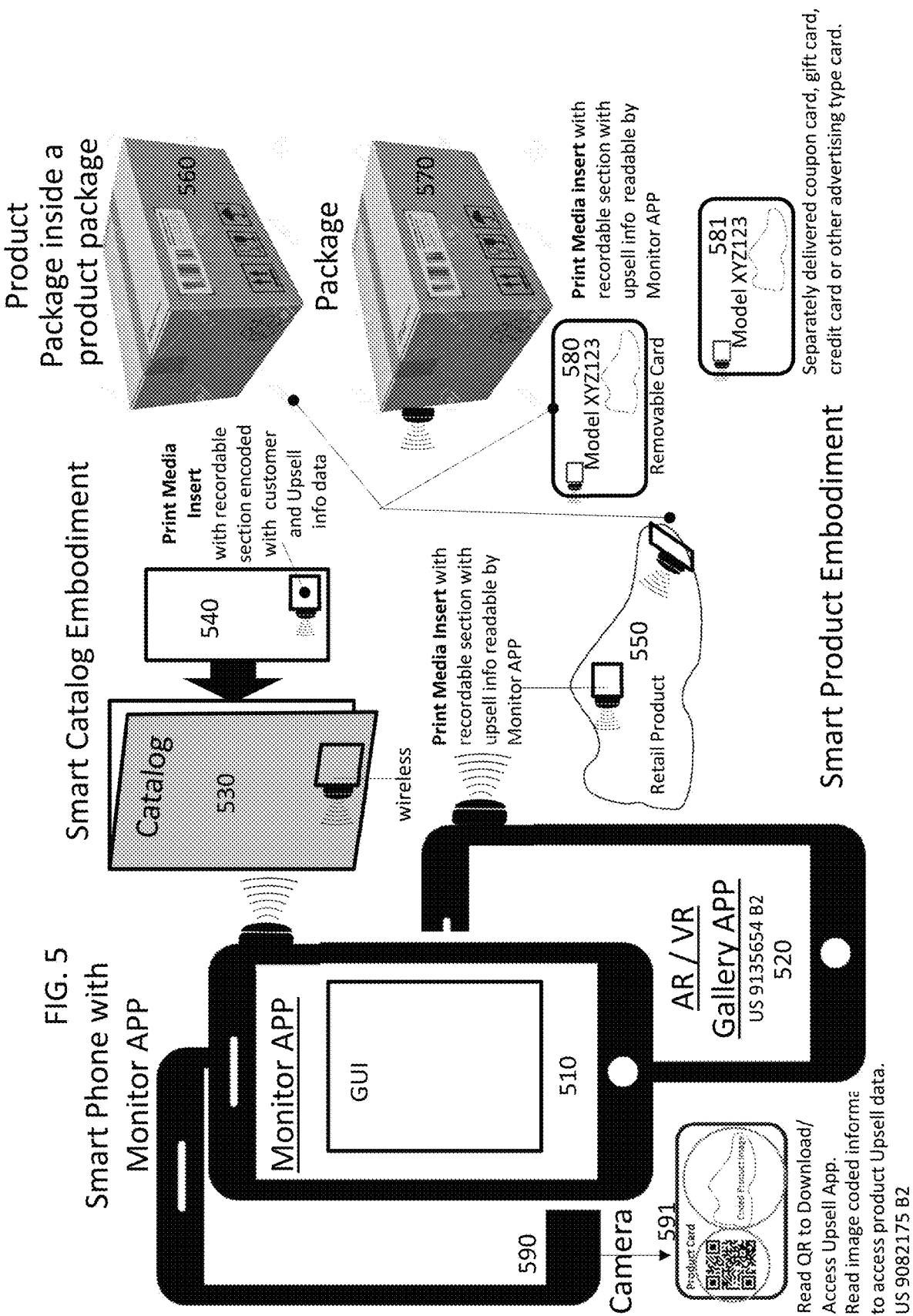
FIG. 5 illustrates user devices that may receive information regarding products, catalogs, or packaging options that may be associated with a product.

FIG. 5 illustrates user devices that may receive information regarding products, catalogs, or packaging options that may be associated with a product. FIG. 5 includes user devices 510, 520, and 590. Catalog 530, insert 540, retail product 550, product in a package 560, package 570, and removable card 580 of FIG. 5 each include one or more wireless transmitter tags and card 591 includes encoded visual data. In certain instances, user devices 510 and 520 may receive information wirelessly transmitted from catalog 530, insert 540, retail product 550, product in a package 560, package 570, removable card 580, and separately delivered card 581. The information received by user device 510 may be displayed on a graphical user interface (GUI) via an application monitoring program at user device 510. Additionally or alternatively, the information received by user device 520 may be received by application programs that are installed on user device 520 where those programs may use that information when performing functions consistent with the present disclosure. Note that catalog 530, insert 540, retail product 550, product in a package 560, package 570, removable card 580, and separately delivered card 581 of FIG. 5 each include one or more wireless transmitter tags and card 591 includes encoded visual data. The wireless transmitter tags may be connected to or be contained within catalog 530, insert 540, retail product 550, product in a package 560, package 570, removable card 580, or a smart/advertising card 581 delivered at a later date. Wireless transmission technologies associated with the present disclosure may include any type of wireless transmission capability known in the art, including, yet not limited to radio frequency identifiers (RFID), Bluetooth™, near field data communications (NFC), iBeacon, CCD, MEMS or other wireless transmission technique. Because of this, user devices 510 and 520 may receive information related to an upsell opportunity that may also be included in or associated with a print media entry or device associated with a catalog 530, an insert 540, a retail product 550, a product in a package 560, a package 570, or a card 581.

NFC is near field communication technology, a communication protocol that allows two electronic devices to communicate wirelessly at close range. An NFC tag is an electronically enabled tag containing information or instructions related to and associated object. RFID is radio frequency identification technology that the energy from the radio waves emitted by a reader to access electronic information stored in electronic circuitry on a tag, key or other object. iBeacon is a proprietary electronic beacon system developed by Apple, based on Bluetooth Low Energy wireless computer networking technology. CCD is a charge coupled device that is used in cameras to capture light and generate images. MEMS are microelectromechanical systems that comprise of microscopic mechanical parts and can be used to create sensors, displays, switches, and other devices.

Catalog 530 is a bound container or physically printed document that includes a tag encoded with product information and Insert 540 is a flyer or other printed media with an encoded tag.

In an example, user devices 510 may receive information from a transmitter connected to product 550 that is a shoe. Upsell software operating on user device 510 may use the information received from product 550 (e.g. shoe) to identify an upsell opportunity for shoe polish, where information relating to the shoe polish may be displayed in the GUI of user device 510. If the user decides to purchase the shoe polish, the user may make a selection in the GUI and user device 510 may then receive information relating to how the shoe polish will be paid for and how the user would like to receive the shoe polish. As such, the user could pay for the shoe polish with a credit card and could order that the shoe polish be sent to an address using next day delivery express mail.

Figure 6:
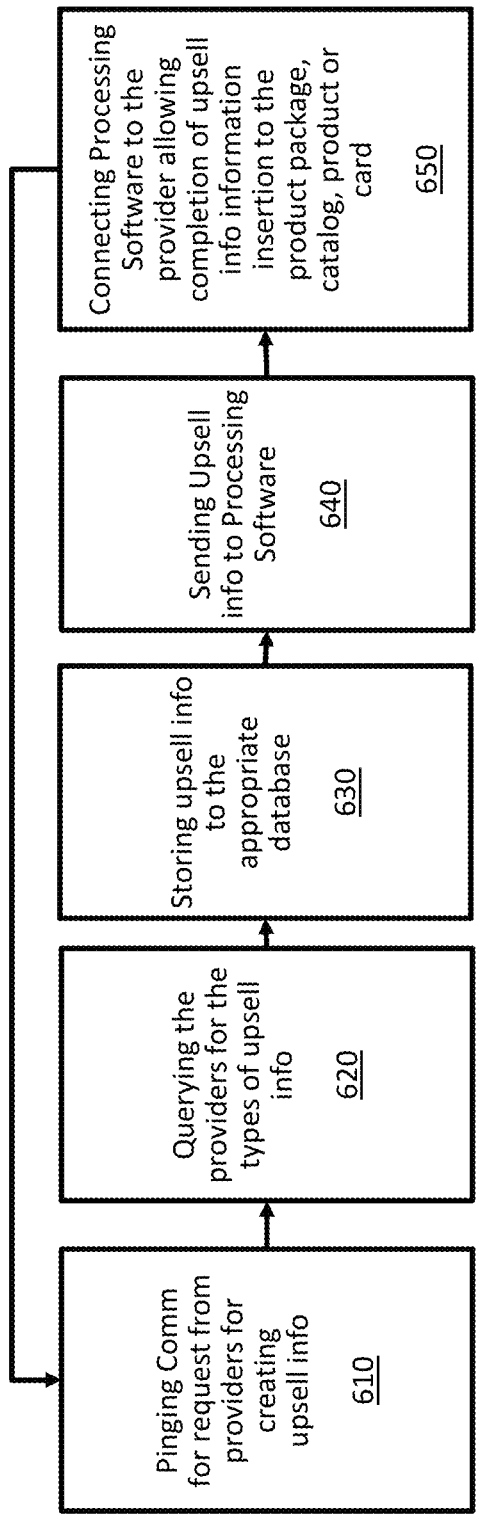
FIG. 6 illustrates a series of exemplary steps consistent with the present disclosure that may be performed by an upsell system that receives information relating to the sale of products and services to customers.

FIG. 6 illustrates a series of exemplary steps consistent with the present disclosure that may be performed by an upsell system that receives information relating to the sale of products and services to customers. Step 610 of FIG. 6 may allow a provider to create offerings that may be offered to customers. When upsell offerings are created, step 610 may ping provider computers to identify whether particular providers are interested in creating new offerings for storage in a database at the upsell system.

Next in step 620 of FIG. 6, information relating to the creation of different types of upsell offerings may be received from providers. The information received in step 620 may be received in response to queries sent from an upsell system.

Next in step 630 of the flow chart of FIG. 6, the information received in step 620 may be stored in a database. Then that information may be sent to upsell processing software in step 640 of FIG. 6. Finally, in step 650, a processor executing the processing software may allow the received upsell information to be associated with a catalog offering. As such, step 650 may maintain a complete listing of a virtual catalog offerings continuously overtime. Step 650 may also allow upsell information to be associated with a product package, a catalog, a product, or with a card/smart card. After new upsell offerings have been created in a database at an upsell system, information related to that new upsell may be verified by a verification process or may be shared with customers when those customers make purchase decisions.

The creating upsell software is continuously comprising (1) Pinging Comm for request from providers for creating upsell info 610, (2) Querying the providers for the types of upsell info 620, (3) Storing upsell info to the appropriate database 630, (4) Sending Upsell info to the Processing Software 640, (5) Connecting the Processing Software to the provider allowing completion of upsell info information insertion to the product package or to the catalog—product—or card/smart card 650, and (6) returning to Pinging Comm (step 610) when requesting upsell opportunities from providers for creating upsell information opportunities.

This software leverages the Processing Software that allows for a closed loop system to insert recordable information on a catalog, product or packaging and then executing a transaction between stakeholders (customer, providers, or others).

Figure 7:
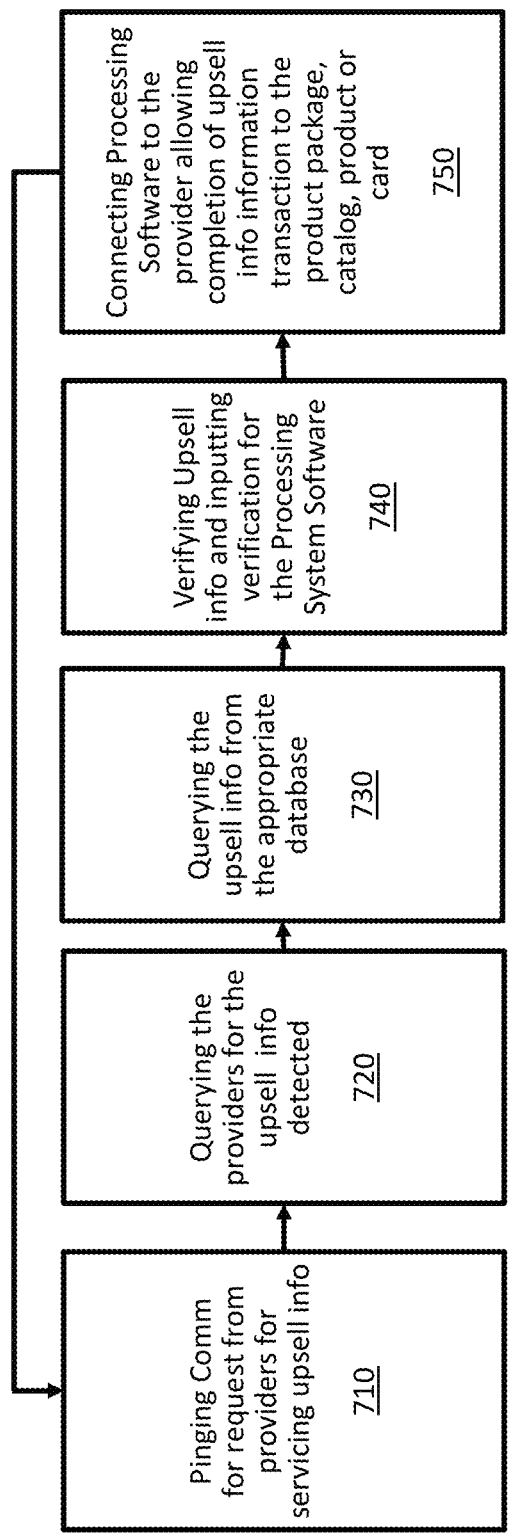
FIG. 7 illustrates a series of exemplary steps that may be performed by an upsell system that services upsell requests or that validates provider upsell information.

FIG. 7 illustrates a series of exemplary steps that may be performed by an upsell system that services upsell requests or that validates provider upsell information. Step 710 of FIG. 7 may send requests (ping) different providers to receive information regarding potential upsell requests that may be received from those providers. Next step 720 of FIG. 7 may query one or more providers for information relating to different types of upsell opportunities that may be provided by those providers, step 720 may also receive information from different providers based on the query.

Next, step 730 may query upsell information stored at a database that may be related to the types of upsell opportunities that may be provided by one or more providers. After step 730, step 740 may verify whether the upsell information stored at the database are consistent with the types of upsell opportunities received from the providers in step 720. Finally, step 750 of FIG. 7 may allow processing software associated with an upsell system to complete upsell transactions based on available upsell opportunities and customer demand. Step 750 may also allow upsell information to be associated with a product package, a catalog, a product, a card, or with a smart card.

This method is used by the providers to service requests from the providers. The servicing upsell software is continuously comprising (1) Pinging Comm for request from providers for creating upsell info 710, (2) Querying the providers for the upsell info detected 720, (3) querying the upsell info from the appropriate database 730, (4) verifying Upsell info and inputting verification for the Processing Software 740, (5) Connecting Processing Software to the provider allowing completion of upsell info information insertion transaction to the product package, catalog, or product 750, and (6) returning to Pinging Comm for request from providers for creating upsell info 710.

This software leverages the Processing Software that allows for a closed loop system to insert recordable information on a catalog, product or packaging and then executing a transaction between stakeholders (customer, providers, others)

Figure 8:
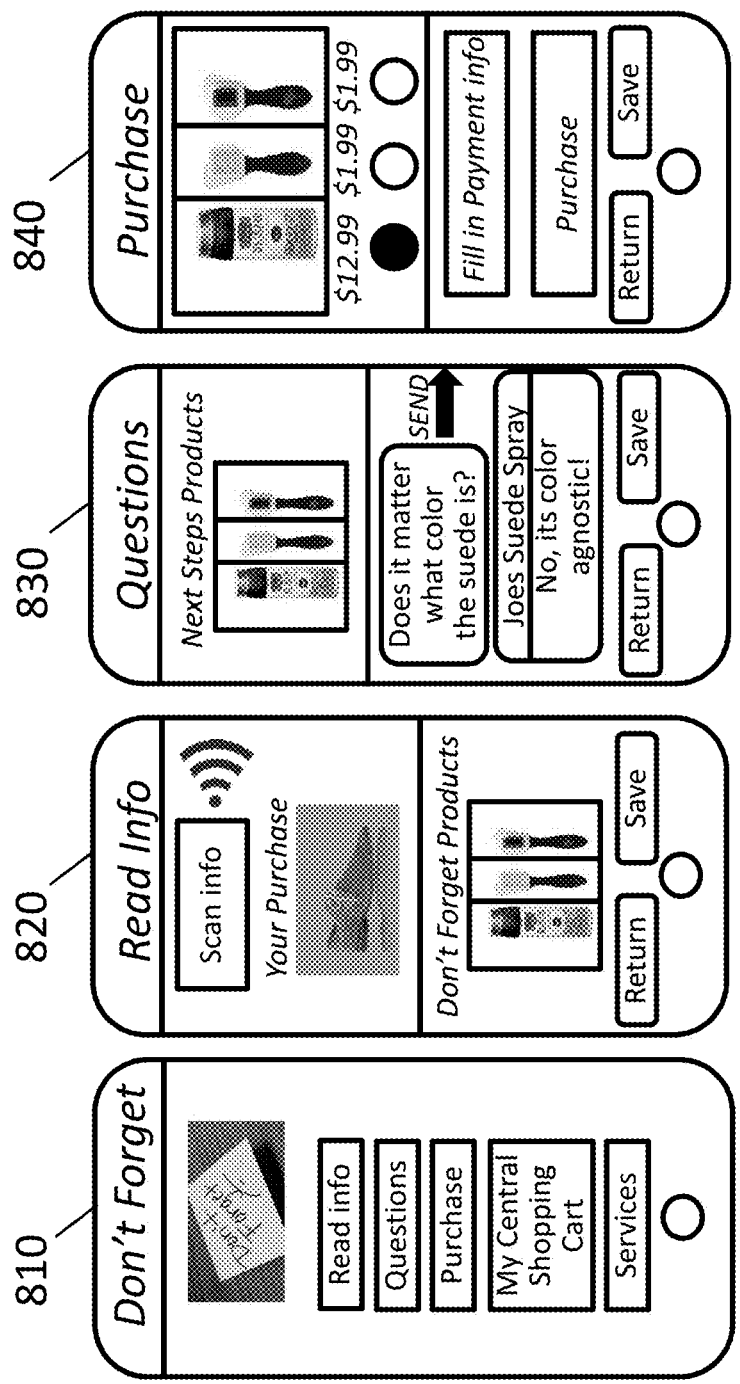
FIG. 8 illustrates exemplary content that may be displayed on user devices when a user of a use device makes a purchase.

FIG. 8 illustrates exemplary content that may be displayed on user devices when a user of a use device makes a purchase. FIG. 8 includes user interface 810 that displays information relating to a "don't forget" reminder and user interface 820 that displays information that may read relating to a purchasing and ordering products. User interface 830 includes information relating to questions that a customer may have regarding a purchase. Finally, user interface 840 includes information relating to an item selected for purchase. Note that the don't forget user interface 810 includes selection boxes that may be used to open the read info 810 user interface, the questions 830 user interface, or the purchase 840 user interface. Note also that each respective user interface includes various different selection boxes that may be selected to make a purchase, change items that are purchased, display content of a shopping cart, return to a previously user interface selection, or to save information included in a user interface.

The Upsell App GUI which is branded as "Don't Forget" 810. Upon entering the App (A) customer has the choice of reading information on the upsell info tag on the product, the catalog or the packaging, once read the customer has the ability to ask questions of the info provided or to actually purchase the upsell product. Once the customer initiates the "read Info" icon, the Read Info GUI B 820 is initiated. The customer has the ability to scan the catalog, package, or product (Scan Info icon). Once connected and scanned the wireless connection signal may transmit the scanned info. This initiates the provider to initiate the servicing upsell info software in the Upsell System. (Note that previously the Upsell system was used to create the upsell information on the product, catalog, or packaging). Once the customer sees what was purchased the and upsell products are shown in the "Don't Forget Products." The customer can return or save the information. The customer may ask questions before purchase, by initiating the questions icon on a first question GUI panel A. The questions GUI C 830 is shown, the customer may then interact with the upsell product by sending and receiving information. The customer can return or save the information. If the customer decides to purchase the upsell product the initiate the purchase icon on a first purchase GUI A which may open another purchase GUI D. The consumer can see the prices, select the products to purchase and fill in payment info and purchase the items. When purchasing the products, the provider is connected to and the providers may then initiate the upsell system servicing. The customer can return or save the information. Saved Upsell product selections (from a single or multiple providers) can be saved in My Central Shopping Cart where pending purchases, history, etc. can be managed. Additional transaction details can be controlled through Actions to create schedules, alerts and wish lists.

Figure 9:
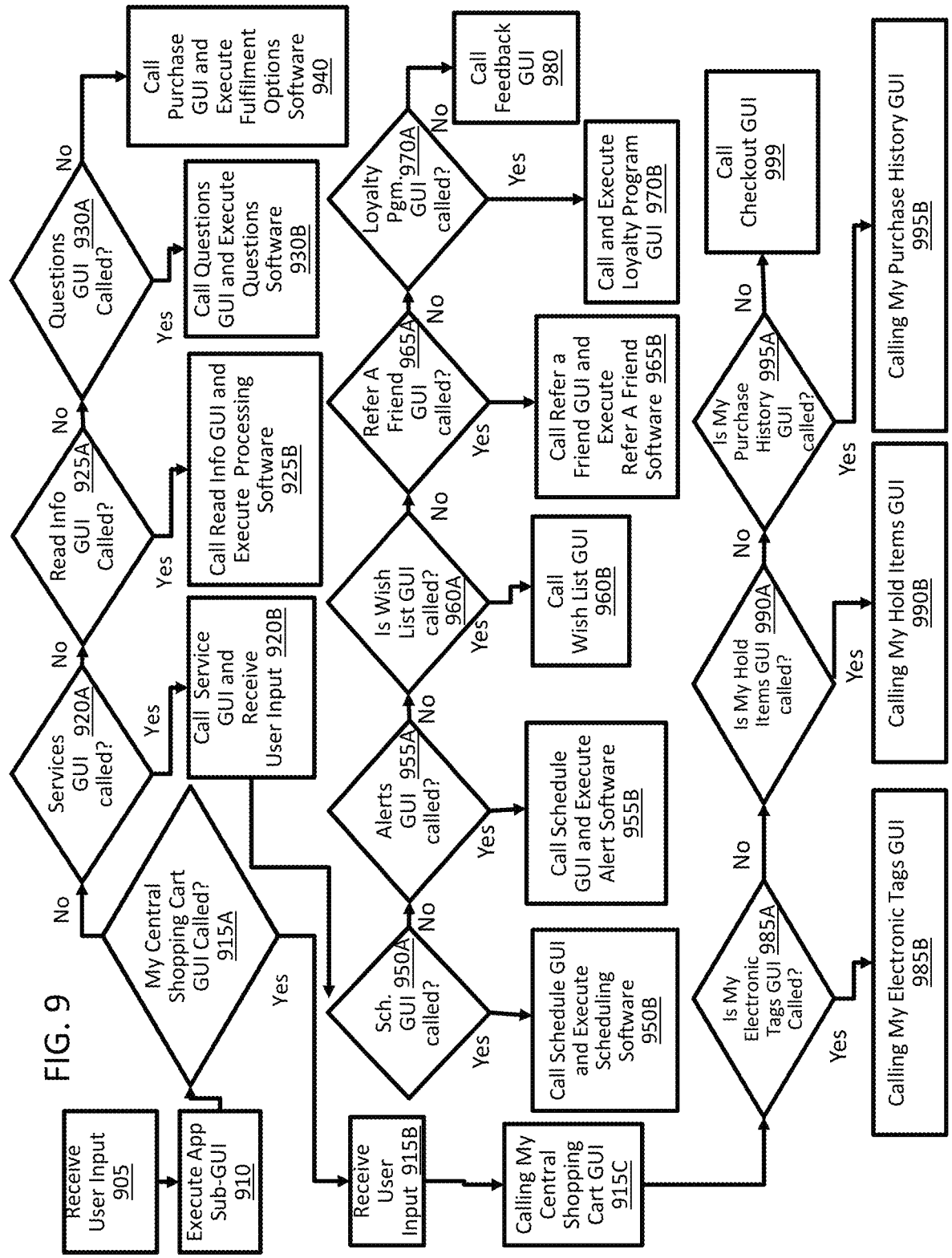
FIG. 9 illustrates a series of steps that may be performed by upsell software consistent with the present disclosure.

FIG. 9 illustrates a series of steps that may be performed by upsell software consistent with the present disclosure. Step 905 of FIG. 9 may receive user input information. After step 905, step 910 may open a graphical user interface (GUI) that may allow a user of a user device to select a type of sub-GUI. Next a series of determination steps (915A 920A, 925A, and 930A) may be used to identify what type of sub-GUI has been selected by a user of the user device. Note that step 915A relates to opening a shopping cart GUI, that step 920A relates to opening a services GUI, that step 925A relates to opening an information GUI, and that step 930A relates to opening a question GUI. When each of determination steps 915A 920A, 925A, and 930A identify that a GUI has not been selected, program flow moves to step 940 where a purchase GUI may be opened and where a purchase may be performed, executed, and fulfilled.

When step 915A identifies that the user wishes to open a shopping cart, program flow may move to step 915B where additional user input may be received. Next program flow may move to step 915C that calls the shopping cart GUI for information that performs different determination steps 985A, 990A, and 995A may identify whether a function associated with the shopping cart should be performed. When each of determination steps 985A, 990A, and 995A identify that a GUI has not been selected by a user, step 999 of FIG. 9 may call a check out GUI, where a user may complete a purchase.

When determination step 985A identifies that additional user input received in step 915B relates to a GUI associated with an electronic tag, program flow may move to step 985B where the electronic tag GUI is called. When determination step 990A identifies that additional user input received in step 915B relates to a GUI associated with a product "hold my items request," program flow may move to step 990B where a "hold my items GUI" is called. When determination step 995A identifies that additional user input received in step 915B relates to a GUI associated with a purchase history, program flow may move to step 995B where a purchase history GUI is called.

When step 920A identifies that a services GUI has been selected by a user, program flow may move to step 920B that calls the services GUI and that receives user input. After step 920B are a series of determination steps (950A, 955A, 960A, 965A, and 970A) that may identify whether the user has selected a schedule GUI, an alerts GUI, a wish list GUI, a friend GUI, or a loyalty program GUI in any of steps 950A, 955A, 960A, 965A, and 970A. When the user has not selected any GUI associated with steps 950A, 955A, 960A, 965A, and 970A, program flow moves to step 980 where a callback GUI is called.

A loyalty program is a rewards program offered by product and service providers that provides special offers, discounts, access, etc. to frequent or high dollar volume customers.

When step 950A identifies that the user wishes to open a schedule GUI, program flow may move to step 950B where the schedule GUI may be called and software relating to scheduling a purchase may be executed. When step 955A identifies that the user wishes to open an alerts GUI, program flow may move to step 955B where the alerts GUI may be called and software relating to an alert may be executed.

When determination step 960A identifies that the user wishes to open a wish list GUI, program flow may move to step 960B where the wish GUI may be called and where software relating to products that the user would like to acquire may be executed. When step 965A identifies that the user wishes to open a "refer a friend GUI," program flow may move to step 965B where the "refer a friend GUI" may be called and where software relating to a friend referral may be executed. When step 970A identifies that the user wishes to open a loyalty program GUI, program flow may move to step 970B where the loyalty program GUI may be called and where software relating to scheduling the loyalty program may be executed.

FIG. 9 illustrates that a processor executing instructions out of a memory at an upsell system may receive user input that allows a user to open different types of GUIs when entering information relating to purchases, upsell purchases, products, and/or services that a user may like to buy using a user device that may be communicatively coupled to an upsell system consistent with the present disclosure.

The Upsell software receives data from the Upsell APP GUI as input by the customer. Based on this input the software presents the customer with the appropriate GUI and/or executes the appropriate software to satisfy the customer request.

Figure 10:
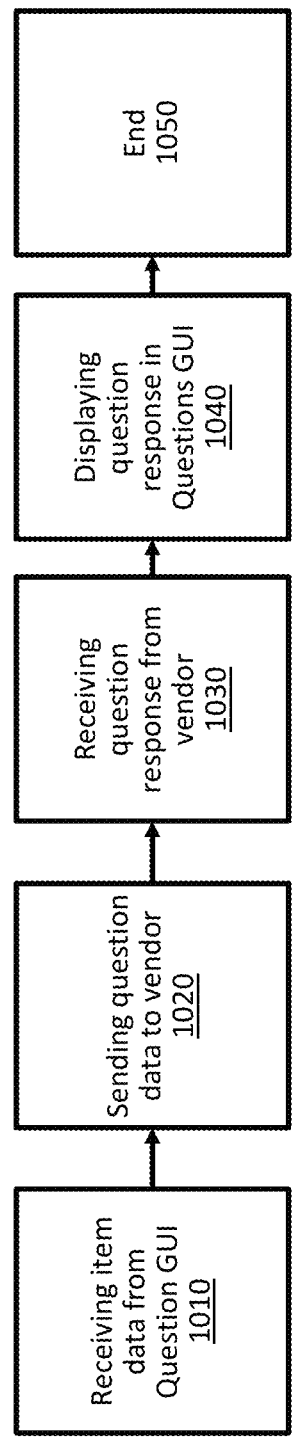
FIG. 10 illustrates exemplary steps of a flow chart where questions from a customer may be shared with a provider.

FIG. 10 illustrates exemplary steps of a flow chart where questions from a customer may be shared with a provider. Step 1010 of FIG. 10 is a step where a user may enter one or more questions over a GUI at a user device. After these questions are entered into the GUI, they may be sent to a provider in step 1020 of FIG. 10. Next, in step 1030, the customer's user device may receive answers to those questions where the answers to those questions may be displayed in the GUI at the customer's user device in step 1040 of FIG. 10. Finally, after step 1040 of FIG. 10, program flow ends in step 1050.

The Questions Software receives input from the Questions GUI 1010 in the form of a question from the customer. This question is relayed 1020 to the provider/merchant 1030 of the Upsell product. The provider/merchant response to the question is presented to the customer in the Questions GUI 1040.

Figure 11:
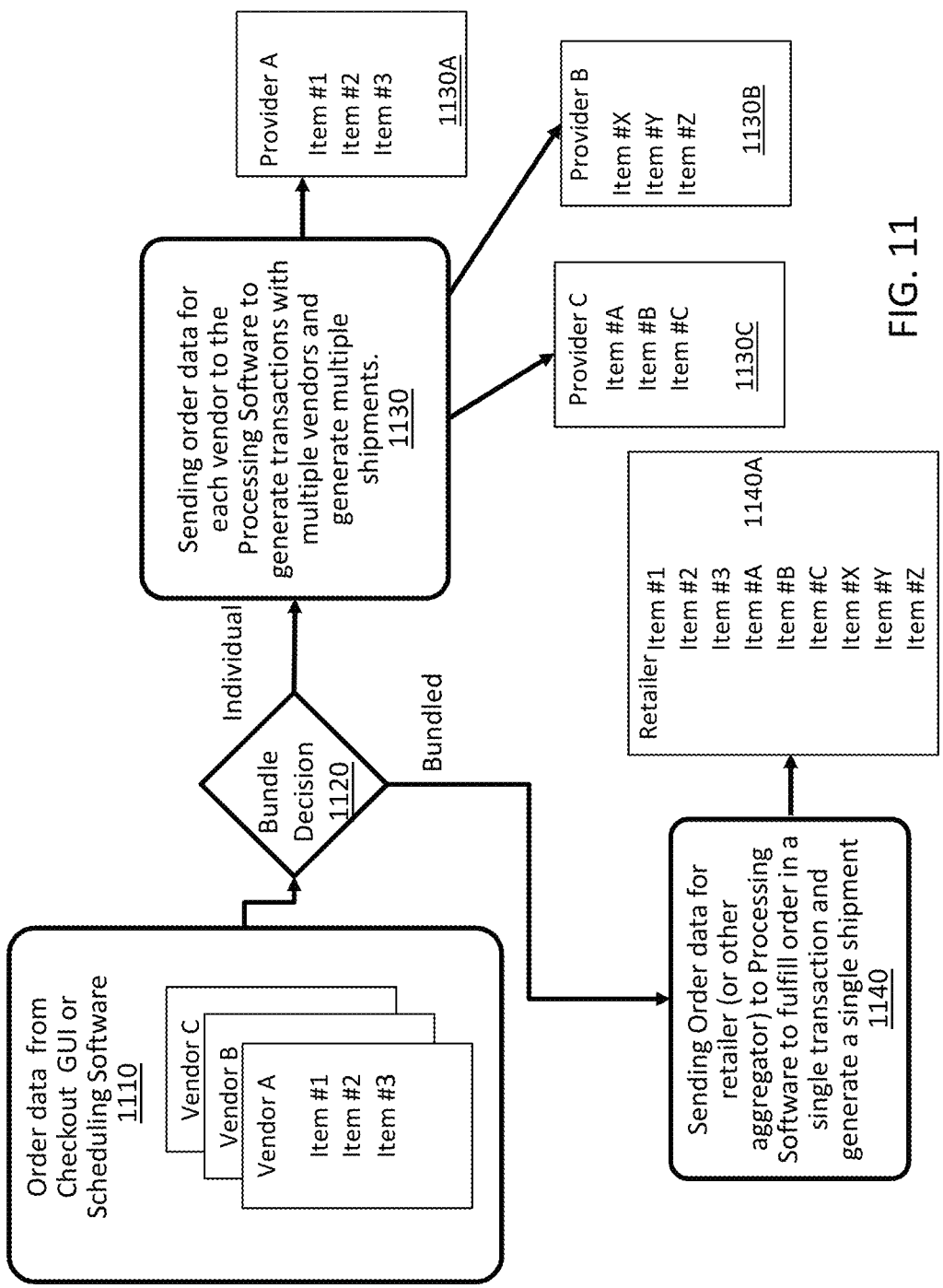
FIG. 11 illustrates an exemplary flow chart where various items ordered by a customer may be fulfilled by a single provider or may be fulfilled by several different providers.

FIG. 11 illustrates an exemplary flow chart where various items ordered by a customer may be fulfilled by a single provider or may be fulfilled by several different providers. In step 1110 of FIG. 11 order data including a plurality of items are received from a checkout GUI. Determination step 1120 may then identify whether a user wishes all off the items listed in the checkout GUI be purchased from various different individual providers or be bundled and be purchased from a single provider.

When determination step 1120 identifies that the items ordered by the customer should be purchased from several different providers, step 1130 of FIG. 11 may send order 1130A to provider A, order 1130B to provider B, and send order 1130C to provider C. After step 1130, providers A, B, and C may each fulfill orders 1130A, 1130B, and 1130C.

When determination step 1120 identifies that the items ordered by the customer should be bundled, order 1140A may be sent to a single provider for fulfillment in step 1140.

Steps performed by the fulfillment software of FIG. 11 may be performed at a user device based on information received from an upsell system, such as upsell system 105 of FIG. 1. Alternatively, the steps performed by the steps of FIG. 11 may be performed by a user device and by one or more different computers.

The Fulfillment Option Software allows customers to select the method of fulfillment for an Upsell to, if desired, potentially avoid multiple shipments. Items can be ordered and shipped individually from each provider that is offering an Upsell item or Bundled by a retailer (or other aggregator) to generate a single transaction and single shipment. This choice is offered in the Check Out GUI and received as a component of the order data that is sent when the transaction is initiated on the Check Out GUI. Based on the fulfillment option selected, order data is sent to the Processing Software to generate a single transaction with at retailer or multiple transactions with individual providers.

Figure 12:
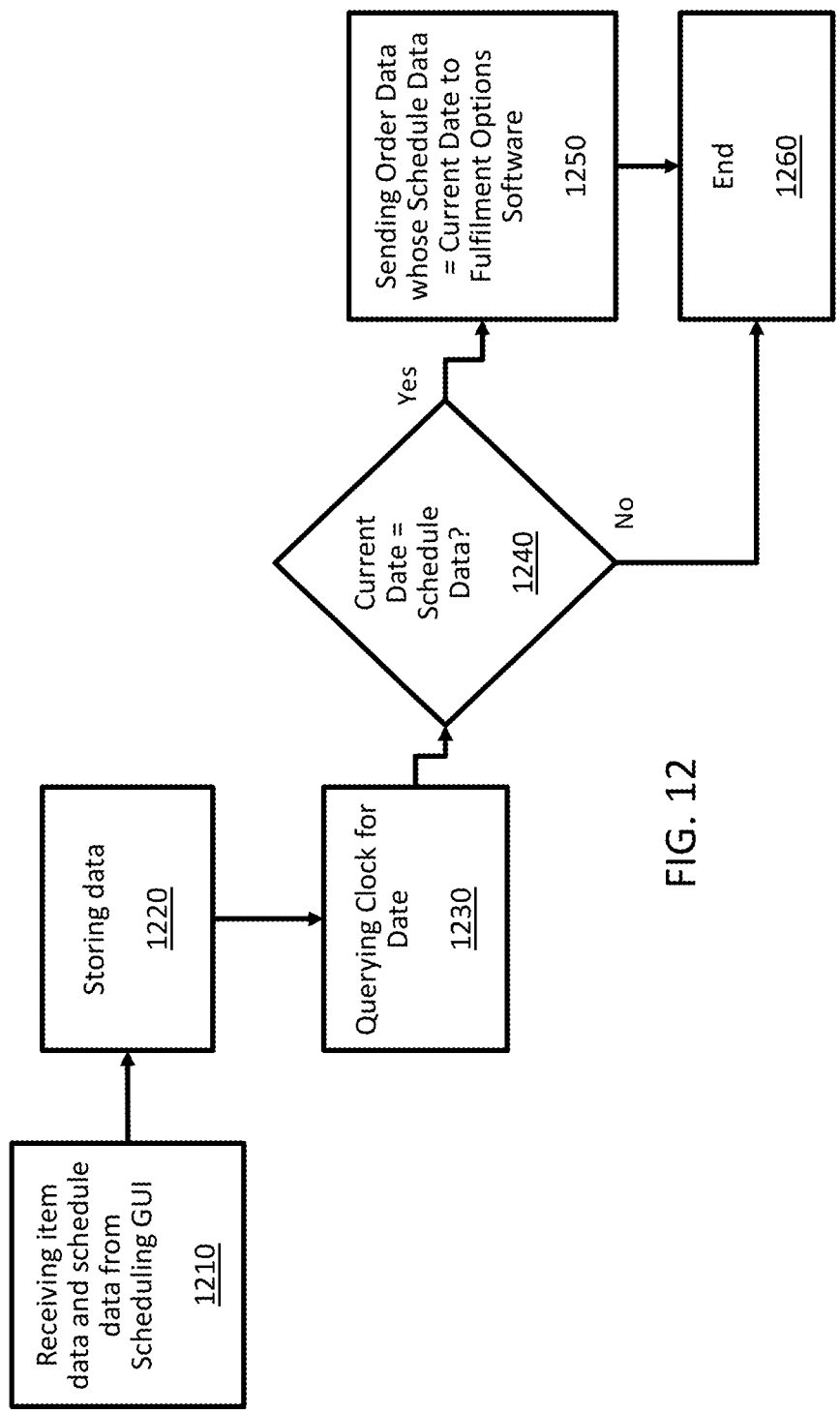
FIG. 12 illustrates exemplary steps that may be performed by a method that schedules the fulfillment of customer orders.

FIG. 12 illustrates exemplary steps that may be performed by a method that schedules the fulfillment of customer orders. Step 1210 of FIG. 12 may receive information that identifies items that a customer has ordered and may receive information that identifies a schedule relating to how the order will be fulfilled.

Next step 1220 of FIG. 12 may store the received order item and fulfillment data received in step 1210, after step 1220, a date and a time may be retrieved from a clock in step 1230. Next, determination step 1240 may identify whether the current date corresponds to the scheduling data received in step 1210, when yes, program flow may move to step 1250 that sends order data that corresponds to today's date is sent to a fulfillments option software, such that the order may be fulfilled. After step 1250, the scheduling software program flow of FIG. 12 ends at step 1260.

When determination step 1240 identifies that the current data does not correspond to a scheduled date program, the scheduling software program flow of FIG. 12 also ends at step 1260.

Fulfillment is the receiving an order, processing and order and the delivery of the ordered product or service to the customer.

The Scheduling software receives purchase schedule data from the Scheduling GUI and stores this data and queries the clock for the date and/or time of day. The scheduled purchase data is queried and compared to the queried clock data. For those Upsell items with scheduled dates/times matching the current date/time, Upsell item order data is send to the Fulfillment Options Software to begin the purchase process.

Figure 13:
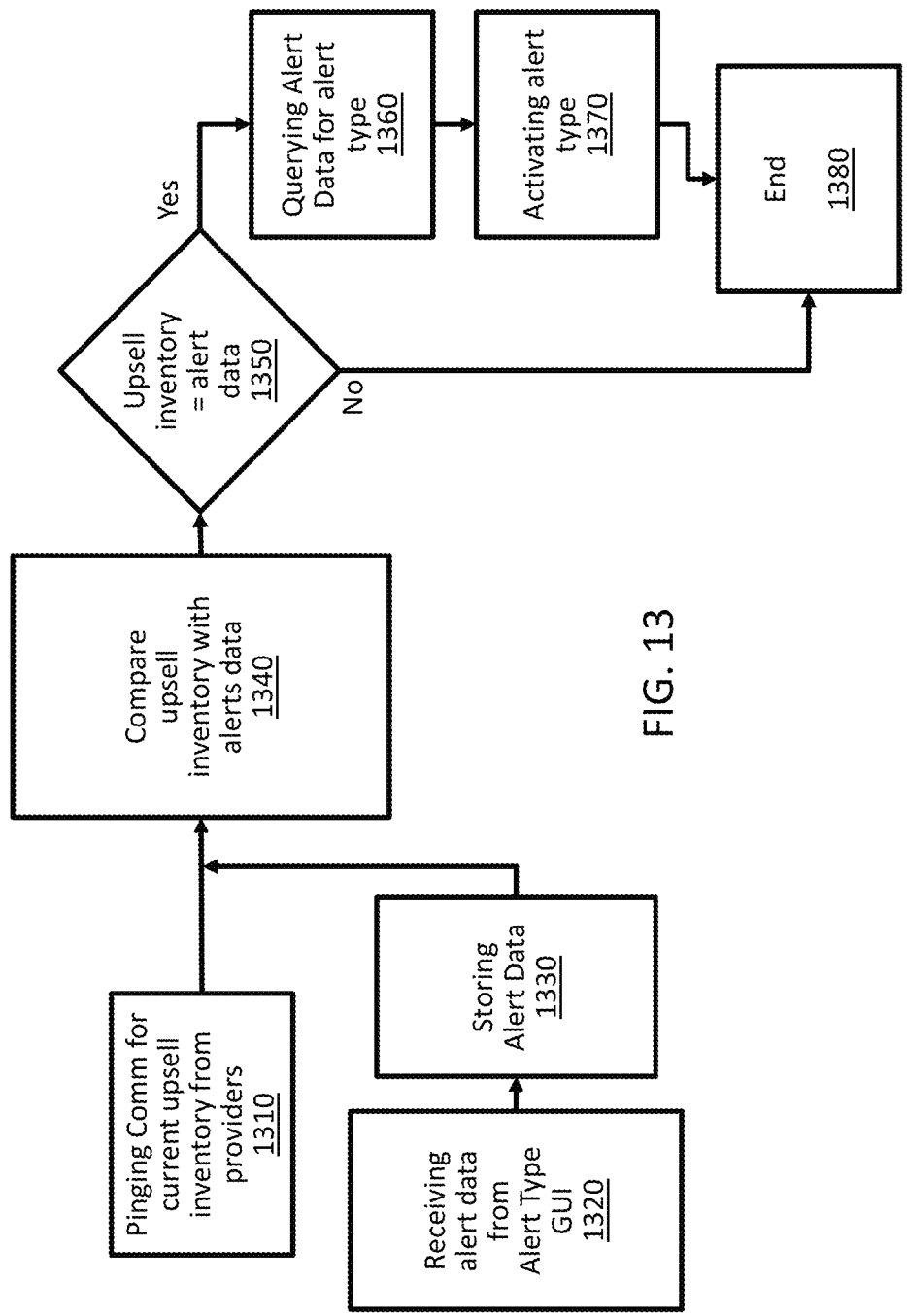
FIG. 13 illustrates exemplary alert software that may be used to setup and activate alerts that relate of orders made at a user device.

FIG. 13 illustrates exemplary alert software that may be used to setup and activate alerts that relate of orders made at a user device. Software consistent with the alert flow chart of FIG. 13 may be executed at an upsell system using information entered by a user in an alert GUI at a user device. Step 1310 of FIG. 13 may send requests (ping) providers when identifying what inventory is currently available at different providers.

Step 1320 of FIG. 13 may receive alert data entered over an alert GUI displayed on a display at a use device. After step 1320 the alert data entered in the alert GUI in step 1320 may be stored in a memory in step 1330. Next, step 1340 of FIG. 13 may compare the upsell inventory data received in step 1310 with the alert data received from the alert GUI in step 1320.

Determination step 1350 may then identify whether the upsell inventory corresponds to the alert data received in step 1320 based on the comparison performed in step 1340. When determination step 1350 identifies that the upsell inventory does not match the received alert data, program flow ends in step 1380. When determination step 1350 identifies that the upsell inventory matches the received alert data, program flow moves to step 1360 where the received alert data is parsed/queried to identify an alert type that is associated with the alert data. After step 1360, step 1370 may activate or initiate an alert of the alert type identified in step 1360. After step 1370 program flown ends in step 1380.

The Alerts software receives inventory data from the Upsell System Comm and Customer Alerts data from the Alerts GUI and Alerts Type GUI. Alerts data is compared to the inventory data. An alert is activated for the customer for inventory items matching alerts criteria set by the customer. The activated alert is based on the alert type established by the customer in the Alerts Type GUI.

Figure 14:
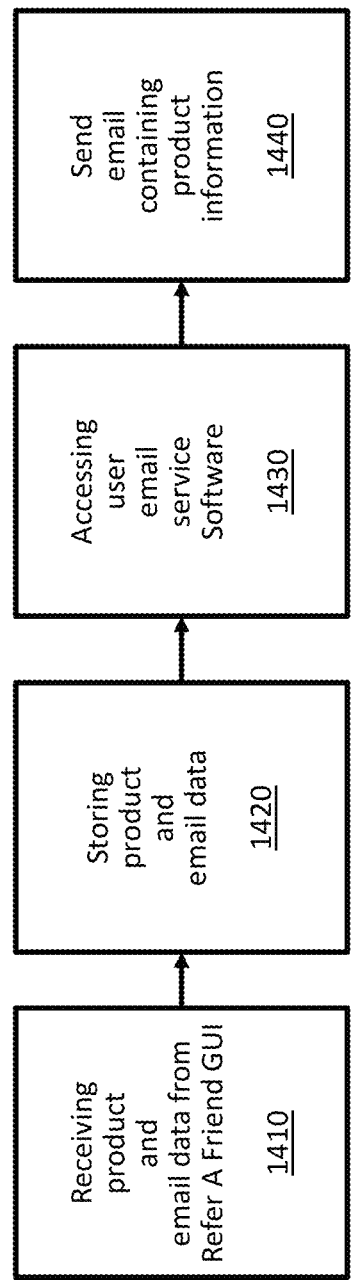
FIG. 14 illustrates exemplary steps that may refer a product offering to a friend.

FIG. 14 illustrates exemplary steps that may refer a product offering to a friend. Step 1410 of FIG. 14 data may be received via a "refer a friend GUI" at a user device. The data received may include an email address or other contact information associated with a friend of a customer. Next in step 1420 of FIG. 14 the information received in step 1410 may be stored. After step 1420, step 1430 may access and prepare information to send to the friend of the customer. Next step 1440 may send an email to the friend of the customer that includes product information that the customer's friend might be interested in purchasing.

The Refer A Friend software receives product and email data from the Refer A Friend GUI. This information is stored and sent to the user's email service software. The email software is then used to send the product information to the email specified in the referral. In other embodiments the users SMS software or social media APPs or other communication software is used to transmit the referral.

Figure 15:
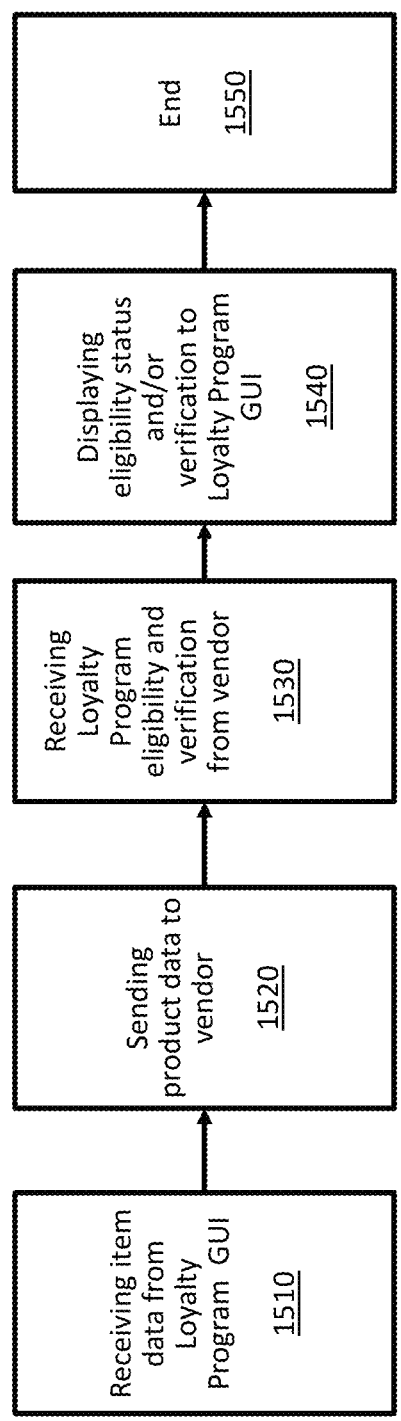
FIG. 15 illustrates exemplary steps that may be performed by loyalty program software consistent with the present disclosure.

FIG. 15 illustrates exemplary steps that may be performed by loyalty program software consistent with the present disclosure. Step 1510 of FIG. 15 receives loyalty data entered via a loyalty program GUI at a user device, this received loyalty data may identify products that a customer has purchased. Next in step 1520, the loyalty program software may send product information to a provider. The loyalty product information sent to the provider may include the information that identifies products that were previously purchased by the customer that were purchased using the provider.

Next, information may be received from the provider that verifies that the customer did purchase the products from the provider in step 1530 of FIG. 15. After step 1530 identifies that the customer did purchase the products from the provider, one more offerings of a loyalty program may be sent to a user device of the customer that the customer may select from as a loyalty reward in step 1540. After step 1540, program flow may end in step 1550 of FIG. 15.

The Loyalty software receives product and provider data from the Loyalty Program GUI. This data is sent to the /provider. The /provider receives the data and determines the eligibility of the product for loyalty benefits, issues the benefit if appropriate and notifies the user of the status of the redemption request. This information is displayed in the Loyalty Program GUI. Another embodiment allows the user to view Loyalty Program information directly on the /provider website with in this GUI.

Figure 16:
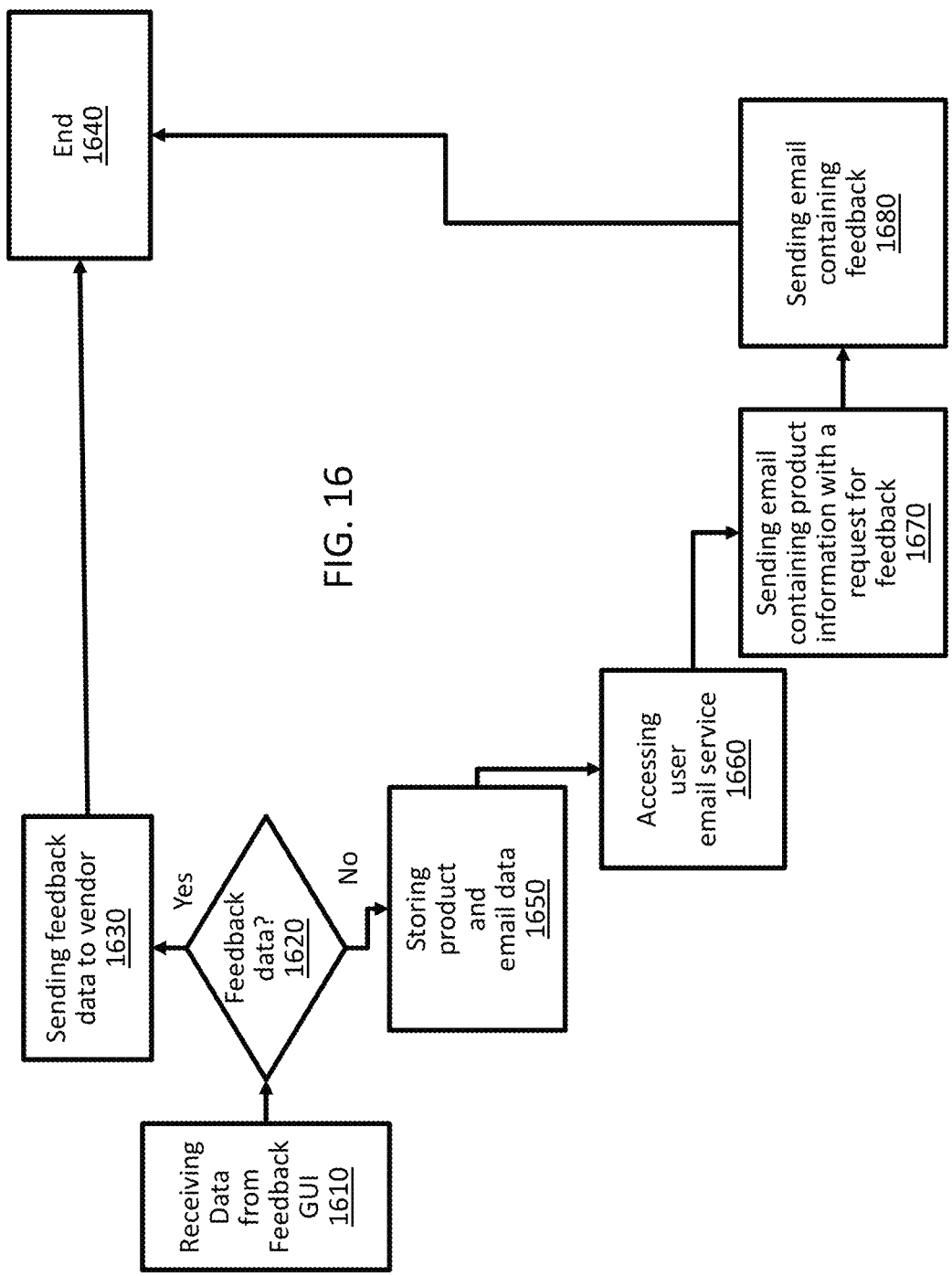
FIG. 16 illustrates a flow chart of a method that may be used to provide feedback regarding the performance of a provider after a customer has purchased a product from that provider.

FIG. 16 illustrates a flow chart of a method that may be used to provide feedback regarding the performance of a provider after a customer has purchased a product from that provider. Step 1610 of may receive information VIA a feedback GUI at a user device. The information received in step 1610 may include information relating to a product purchased by a customer and may include information that rates the customer's experience (feedback information) relating to how satisfied the customer is with products and/or services that were provided by the provider. After step 1610, determination step 1620 identify that the information received in step 1610 included feedback information relating to the performance of a provider has been received from the feedback GUI. When step 1620 identifies that feedback data has been provided, program flow may move to step 1630 of FIG. 16 where the feedback information received in step 1610 may be sent to the vender. After step 1630, the flow chart of FIG. 16 ends in step 1640.

When step 1620 identifies that the information received in step 1610 does not include feedback information, program flow may move from step 1620 to step 1650 where information relating to a product purchased by the customer and customer email contact information may be stored. After step 1650, step 1660 may access an email service after which an email that identifies the product that was purchased by the customer may be sent to the customer in step 1670 of the flow chart of FIG. 16, then step in 1680 an email that contains feedback may be sent. After step 1680, program flow may move to step 1640 where program flow ends.

Figure 17:
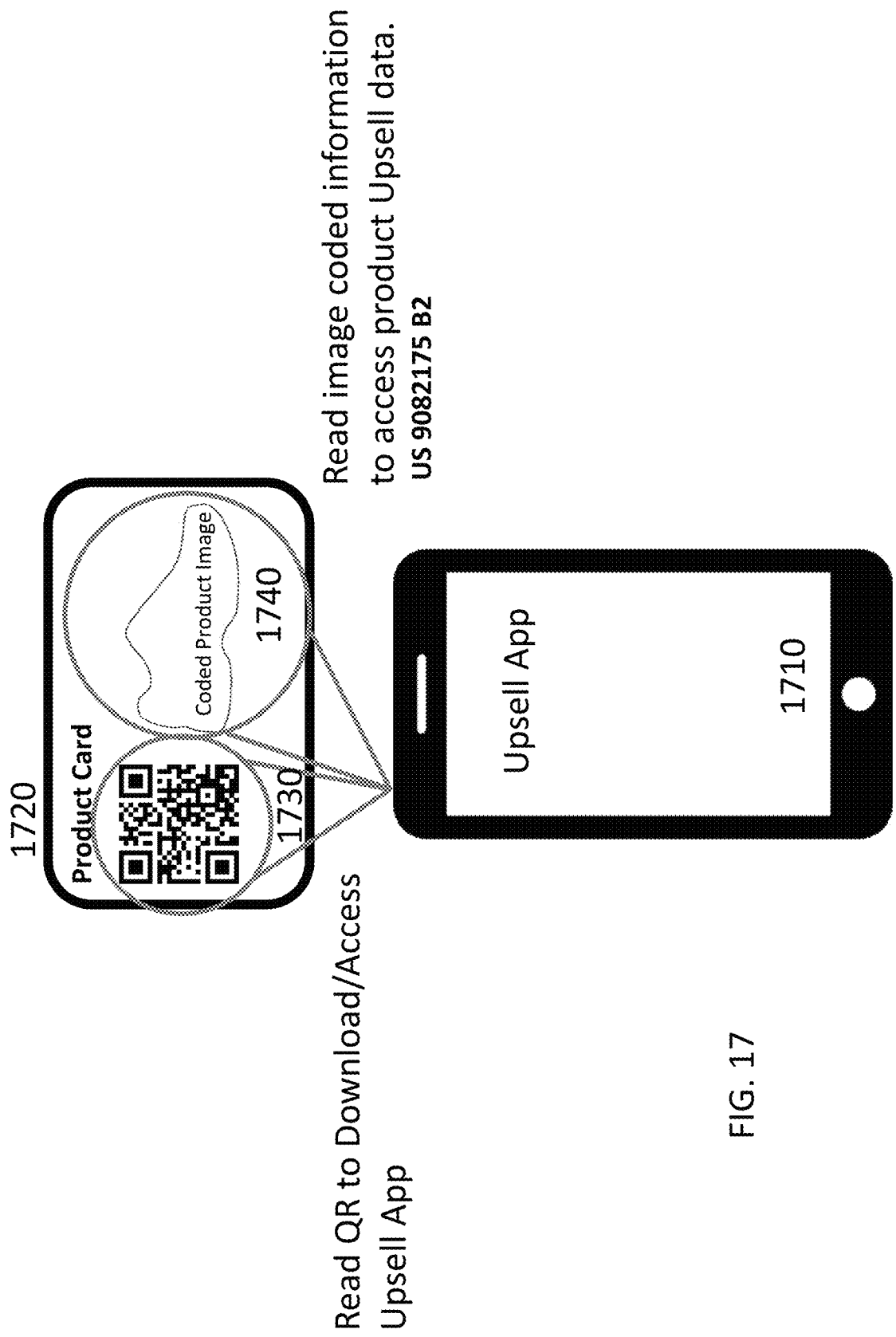
FIG. 17 illustrates a user devices that downloads upsell software and receives information regarding products, catalogs, or packaging options that may be associated with a product.

FIG. 17. illustrates user devices that may receive information regarding products, catalogs, or packaging options that may be associated with a product. FIG. 17 includes a user device 1710, Product Card 1720, a QR or similar printed code 1730, and an image of a retail product 1740. The QR code 2030 is read to download/access the Upsell App and the Product Image 1740 is read to access product Upsell data.

Figure 18:
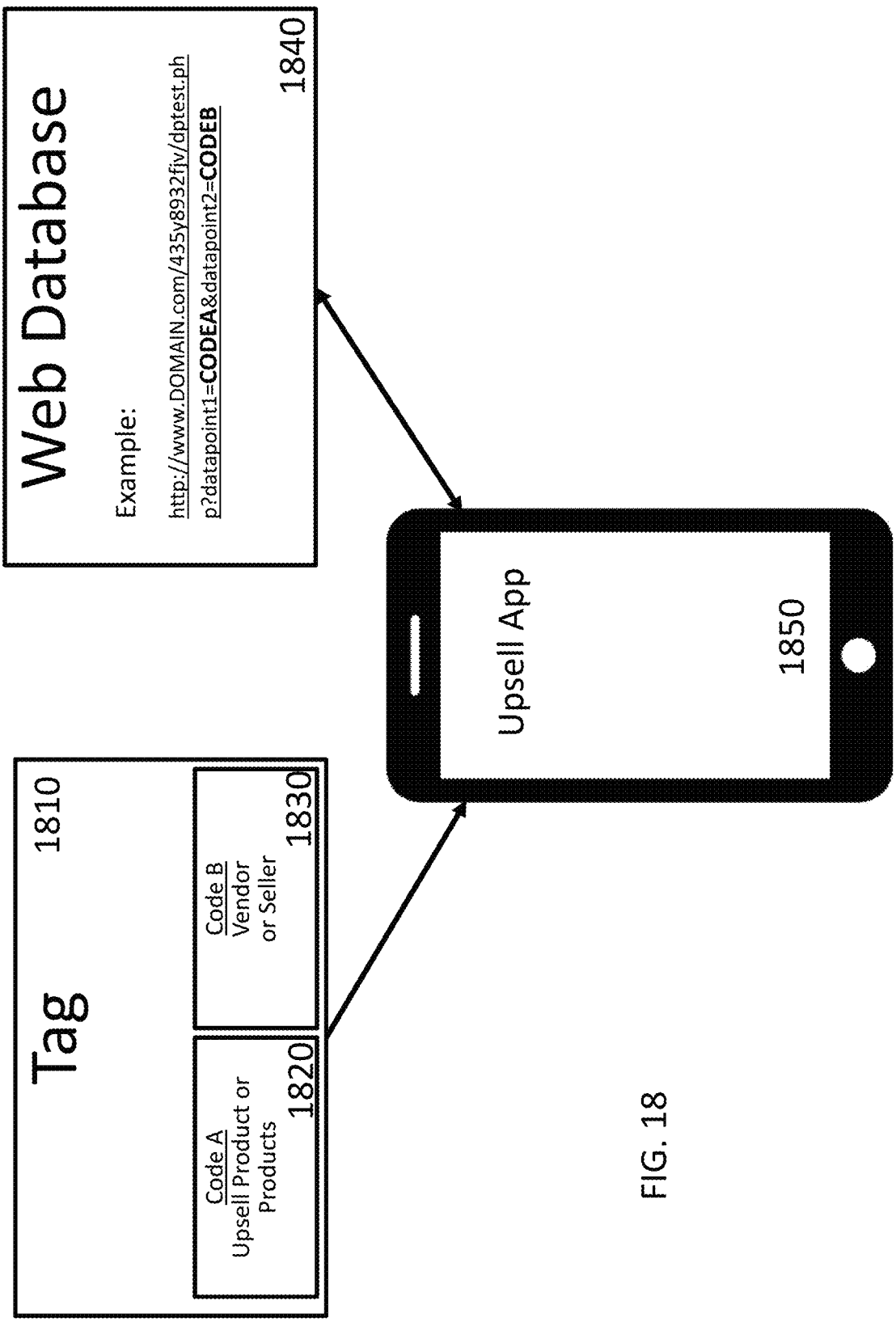
FIG. 18 illustrates a method of encoding product upsell information and retrieving information from a database.

FIG. 18. Illustrates a data structure encoded on tags that may be used to identify products for upsell and their provider. Tag 1810 contains two digitally or graphically encoded number codes. Code A 1820 contain an alphanumeric code of unlimited length to define the upsell product or products. Code B 1830 contains an alphanumeric code of unlimited length to define the seller and/or provider of the upsell product or products. These codes are read by the Upsell App 1850 and combined to generate a web-link to access a web database 1840 that provides an upsell product or products and their providers to the Upsell App 1850.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The Feedback software receives feedback data from the Feedback GUI. If the feedback data is solely for the provider the feedback is sent directly to the provider. If the user is requesting that a friend provide feedback on a product, feedback data including the friends email is stored. This data is then send to the users email service software to generate an email that requests a friend provide feedback.

What is claimed is:

1. A method for providing offerings to customers utilizing associated product tags, the method comprising:
    storing information relating to a plurality of products that are offered by a plurality of providers;
    receiving information related to a tag associated with a first product from the plurality of products from a user device, the tag associated with the first product at a time of shipment of the first product, wherein the tag provides information for associating upsell advertisement information for products or services;
    polling one or more provider computers for the upsell advertisement information for the products or services based on the received tag information;
    receiving the upsell advertisement information from a provider computer as a result of polling the one or more provider computers, the upsell advertisement information identifying a second product or service and including an offering to purchase the second product or service, wherein the provider computer providing the upsell advertisement information is associated with a provider that can provide the second product or service when the second product or service is ordered; and
    sending the received upsell advertisement information to the user device, the upsell advertisement information allowing for ordering of the second product or service and subsequent fulfillment of the same by the provider.

2. The method of claim 1, wherein the tag is attached to the first product.

3. The method of claim 1, wherein the tag is included inside of a package or included on the package of the first product.

4. The method of claim 1, wherein the tag wirelessly transmits the information related to the tag to the user device.

5. The method of claim 1, wherein the tag includes print media that identifies the first product, and the print media included in the tag is captured by a camera at the user device.

6. The method of claim 1, wherein the received information related to the tag includes a first code that identifies an upsell product or service and a second code representing a seller or provider of the upsell product or service.

7. The method of claim 6, wherein the at least one of the first code and the second code are converted to a web address that points to a database associated with the at least one of the first code and the second code and the database information is provided to the user device.

8. The method of claim 1, wherein the polling of the one or more provider computers is a request for updated information relating to the first product of the plurality of different products.

9. The method of claim 1, wherein the information relating to the plurality of products offered by the plurality of providers are stored according to one or more product types.

10. The method of claim 1, wherein the user of the user device orders a plurality of products, and the plurality of products ordered by the user are ordered from two or more of the providers of the plurality of the providers based on a selection set in a user interface at the user device.

11. A non-transitory computer-readable storage medium having embodied thereon a program executable by a processor to perform a method for providing offerings to customers using associated product tags, the method comprising:
    storing information relating to a plurality of products that are offered by a plurality of providers;
    receiving information related to a tag associated with a first product from the plurality of products from a user device, the tag associated with the first product at a time of shipment of the first product, wherein the tag provides information for associating upsell advertisement information for products or services;
    polling one or more provider computers for the upsell advertisement information for the products or services based on the received tag information;
    receiving the upsell advertisement information from a provider computer as a result of polling the one or more provider computers, the upsell advertisement information identifying a second product or service and including an offering to purchase the second product or service, wherein the provider computer providing the upsell advertisement information is associated with a provider that can provide the second product or service when the second product or service is ordered; and
    sending the received upsell advertisement information to the user device, the upsell advertisement information allowing for ordering of the second product or service and subsequent fulfilment of the same by the provider.

12. The non-transitory computer-readable storage medium of claim 11, wherein the tag is attached to the first product.

13. The non-transitory computer-readable storage medium of claim 11, wherein the tag is included inside of a package or included on the package of the first product.

14. The non-transitory computer-readable storage medium of claim 11, wherein the at least one tag wirelessly transmits the information related to the tag to the user device.

15. The non-transitory computer-readable storage medium of claim 11, wherein the tag includes print media that identifies the first product, and the print media included in the tag is captured by a camera at the user device.

16. The non-transitory computer-readable storage medium of claim 11, wherein the received information related to the tag includes a first code that identifies an upsell product or service and a second code representing a seller or provider of the upsell product or service.

17. The non-transitory computer-readable storage medium of claim 16, wherein the at least one of the first code and the second code are converted to a web address that points to a database associated with the at least one of the first code and the second code and the database information is provided to the user device.

18. The non-transitory computer-readable storage medium of claim 11, wherein the polling of the one or more provider computers is a request for updated information relating to the first product of the plurality of products.

19. The non-transitory computer-readable storage medium of claim 11, wherein the information relating to the plurality of products offered by the plurality of providers are stored according to one or more product types.

20. The non-transitory computer-readable storage medium of claim 11, wherein the user of the user device orders a plurality of products, and the plurality of products ordered by the user are ordered from two or more of the providers of the plurality of the providers based on a selection set in a user interface at the user device.

21. An apparatus for providing offerings to customers, the apparatus comprising:
a memory;
a processor that executes instructions out of the memory; and
a database that stores information relating to a plurality of products offered by a plurality of providers, wherein:
information related to a tag associated with the first product from the plurality of products is received from a user device,
the tag is associated with the first product at a time of shipment of the first product,
the tag provides information for associating upsell advertisement information for products or services,
the processor executes instructions out of the memory such that one or more provider computers are polled for the upsell advertisement information based on the received tag information,
the upsell advertisement information is received from a provider computer as a result of polling the one or more provider computers,
the upsell advertisement information identifying a second product or service and including an offering to purchase the second product or service,
the provider computer providing the upsell advertisement information is associated with a provider that can provide the second product or service when the second product or service is ordered, and
the received upsell advertisement information is sent to the user device,
the upsell advertisement information allowing for ordering of the second product or service and subsequent fulfillment of the same by the provider.

22. The apparatus of claim 21, wherein the tag is attached to the first product.

23. The apparatus of claim 21, wherein the tag is included inside of a package or included on the package of the first product.

24. The apparatus of claim 21, wherein the tag wirelessly transmits the information related to the tag to the user device.

25. The apparatus of claim 21, wherein the tag includes print media that identifies the first product, and the print media included in the tag is captured by a camera at the user device.

26. The method of claim 1, wherein one or more additional tags are included with the first product, related to the first product, are attached to a package of the first product, or are included in the package of the first product.

27. The non-transitory computer readable storage medium of claim 11, wherein one or more additional tags are included with the first product, related to the first product, are attached to a package of the first product, or are included in the package of the first product.

28. The apparatus of claim 21, wherein one or more additional tags are included with the first product, related to the first product, are attached to a package of the first product, or are included in the package of the first product.

29. The method of claim 1, wherein the tag transmits a near field communication (NFC) signal to the client device, the NFC signal including at least a portion of the information related to the tag.

30. The apparatus of claim 21, wherein the tag transmits a near field communication (NFC) signal to the client device, the NFC signal including at least a portion of the information related to the tag.

31. The method of claim 1, wherein the second product or service is a product or service offered by a financial institution.

32. The non-transitory computer-readable storage medium of claim 11, wherein the second product or service is a product or service offered by a financial institution.

33. The apparatus of claim 21, wherein the second product or service is a product or service offered by a financial institution.

* * * * *